US012333603B2

(12) United States Patent
Liberman et al.

(10) Patent No.: US 12,333,603 B2
(45) Date of Patent: Jun. 17, 2025

(54) SECURE DETERMINISTIC TOKENS FOR ENCRYPTING ELECTRONIC COMMUNICATIONS

(71) Applicant: Chicago Mercantile Exchange Inc., Chicago, IL (US)

(72) Inventors: Stanislav Liberman, Highland Park, IL (US); Ryan David Pierce, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 156 days.

(21) Appl. No.: 18/136,087

(22) Filed: Apr. 18, 2023

(65) Prior Publication Data

US 2023/0252564 A1   Aug. 10, 2023

Related U.S. Application Data

(63) Continuation of application No. 17/376,699, filed on Jul. 15, 2021, now Pat. No. 11,663,666, which is a
(Continued)

(51) Int. Cl.
*G06Q 40/04* (2012.01)
*H04L 9/00* (2022.01)
(Continued)

(52) U.S. Cl.
CPC ............ *G06Q 40/04* (2013.01); *H04L 9/007* (2013.01); *H04L 9/3066* (2013.01); *H04L 9/3213* (2013.01); *H04L 2209/56* (2013.01)

(58) Field of Classification Search
None
See application file for complete search history.

(56) References Cited

U.S. PATENT DOCUMENTS 7,039,610 B2   5/2006   Morano et al.
7,831,491 B2   11/2010  Newell et al.
(Continued)

FOREIGN PATENT DOCUMENTS

EP         2851862 A1      3/2015
WO    WO-2016095012 A1 *   6/2016   ......... G06F 21/6227
(Continued)

OTHER PUBLICATIONS

"Deterministic wallet", Bitcoin Wiki, accessed on Apr. 17, 2018, https://en.bitcoin.it/wiki/Deterministic_wallet, 2 pages.
(Continued)

*Primary Examiner* — Gregory S Cunningham, II
(74) *Attorney, Agent, or Firm* — Lempia Summerfield Katz LLC

(57) ABSTRACT

A computer implemented method includes generating, by a processor associated with a first client computer, a request message; generating, by the processor, a first public token based on a first private token; augmenting, by the processor, the electronic data transaction request message with the first public token; transmitting, by the processor, the augmented electronic data transaction request message to a second client computer; generating, by the processor, a second public token based on the first public token; identifying, by the processor, from a database of result messages, a result message labeled with the second public token, the identified result message including encrypted confidential information; generating, by the processor, a second private token corresponding to the second public token used to identify the result message; and decrypting, by the processor, the encrypted confidential information with the second private token.

20 Claims, 14 Drawing Sheets

Related U.S. Application Data continuation of application No. 15/981,635, filed on May 16, 2018, now Pat. No. 11,100,578.

(51) Int. Cl.
  *H04L 9/30* (2006.01)
  *H04L 9/32* (2006.01)

(56) References Cited

U.S. PATENT DOCUMENTS

| | | | |
|---|---|---|---|
| 7,853,499 | B2 | 12/2010 | Czupek et al. |
| 9,641,338 | B2 | 5/2017 | Sriram et al. |
| 9,673,979 | B1 | 6/2017 | Poole |
| 2005/0096999 | A1 | 5/2005 | Newell et al. |
| 2005/0203826 | A1 | 9/2005 | Farrell et al. |
| 2013/0218739 | A1 | 8/2013 | Kmiec et al. |
| 2014/0006243 | A1 | 1/2014 | Boudreault et al. |
| 2015/0073962 | A1 | 3/2015 | Bixby et al. |
| 2015/0088720 | A1 | 3/2015 | Acuna-Rohter et al. |
| 2015/0127513 | A1 | 5/2015 | Studnitzer et al. |
| 2015/0161727 | A1 | 6/2015 | Callaway et al. |
| 2016/0328796 | A1 | 11/2016 | Acuna-Rohter et al. |
| 2016/0358165 | A1 | 12/2016 | Maxwell |
| 2017/0053349 | A1 | 2/2017 | Peck-Walden et al. |
| 2017/0178417 | A1 | 6/2017 | Bekas et al. |
| 2017/0331774 | A1 | 11/2017 | Peck-Walden et al. |
| 2018/0097638 | A1* | 4/2018 | Haldenby ......... H04W 12/0433 |
| 2018/0276661 | A1 | 9/2018 | Van Wingerden |
| 2018/0367316 | A1 | 12/2018 | Cheng |
| 2019/0035018 | A1 | 1/2019 | Nolan |
| 2019/0066228 | A1* | 2/2019 | Wright ................. H04L 9/0836 |
| 2019/0068365 | A1 | 2/2019 | Wright |
| 2019/0108513 | A1* | 4/2019 | Kano ..................... G06Q 20/40 |
| 2020/0280546 | A1* | 9/2020 | Bartolucci ............ H04L 9/3239 |

FOREIGN PATENT DOCUMENTS

| | | |
|---|---|---|
| WO | 2017/145007 | 8/2017 |
| WO | 2018081668 A2 | 5/2018 |

OTHER PUBLICATIONS

"How Does Bitcoin Work?", Bitcoin, retrieved Dec. 19, 2017, 2 pages, https://bitcoin.org/en/how-it-works.

Andrea M. Antonopoulos, "Mastering Bitcoin: Unlocking Digital Cryptocurrencies", 2 pages, first release Dec. 1, 2014, second release Mar. 6, 2015, O'Reilly Media, Inc.

Andreas M. Antonopoulos, 298 pages, First Edition Dec. 1, 2014, Second release Mar. 6, 2015.

U.S. Appl. No. 15/856,699, filed Dec. 28, 2017.

Aste, et al. Blockchain Technologies: The Foreseeable Impact on Society and Industry, Published in: Computer (vol. 50, Issue:9, pp. 18-28), Sep. 22, 2017 (Year: 2017).

Bips/bip-0032.mediawiki, GitHub, accessed on Apr. 17, 2018, https://github.com/bitcoin/bips/blob/master/bip-0032.mediawiki, 10 pages.

Bitcoin Developer Guide, obtained from https://bitcoin.org/en/develpoer-guide#block-chain, available as early as May 31, 2017.

Can Bitcoin HD public keys be used for symmetric encryption_ Cryptography Stack Exchange, accessed on Apr. 12, 2018, https://crypto.stackexchange.com/questions/18854/can-bitcoin-hd-public-keys-be-used-for-symmetric-encryption.

Daniel R.L. Brown, "Sec 2: Recommended Elliptic Curve Domain Parameters", Standards for Efficient Cryptography, Certicom Research, Jan. 27, 2010, 37 pages, version 2.0.

Darrel Hankerson et al., "Guide to Elliptic Curve Cryptography", 2004, 10 pages, Springer.

Examination Report from EP Application No. 19174761.7, Jul. 28, 2022, EP.

Extended European Search Report, from EP 19174761, Oct. 15, 2019, EP.

Francis Knott, "What is Private Key Encryption?", Koolspan, 2014.

Pieter Wuille, "Hierarchical Deterministic Wallets", Sep. 24, 2017, 17 pages, https://github.com/bitcoin/bips/blob/master/bip-0032.mediawiki#Abstract.

"HD Protocol, HD Wallet, BIP32" bitcoinwiki obtained from https://bitcoin.org/en/glossary/hd-protocol, accessed on Apr. 17, 2018.

* cited by examiner

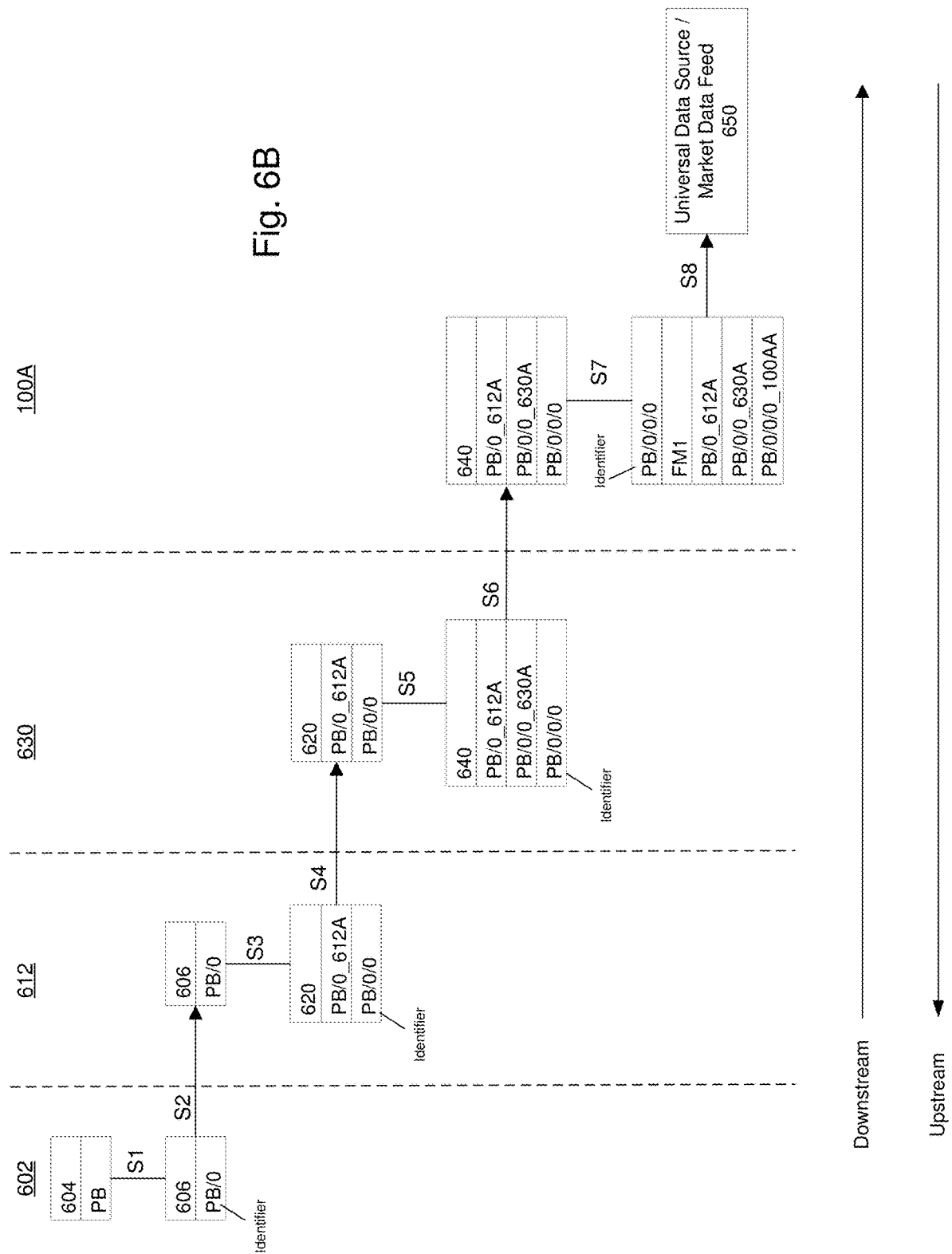

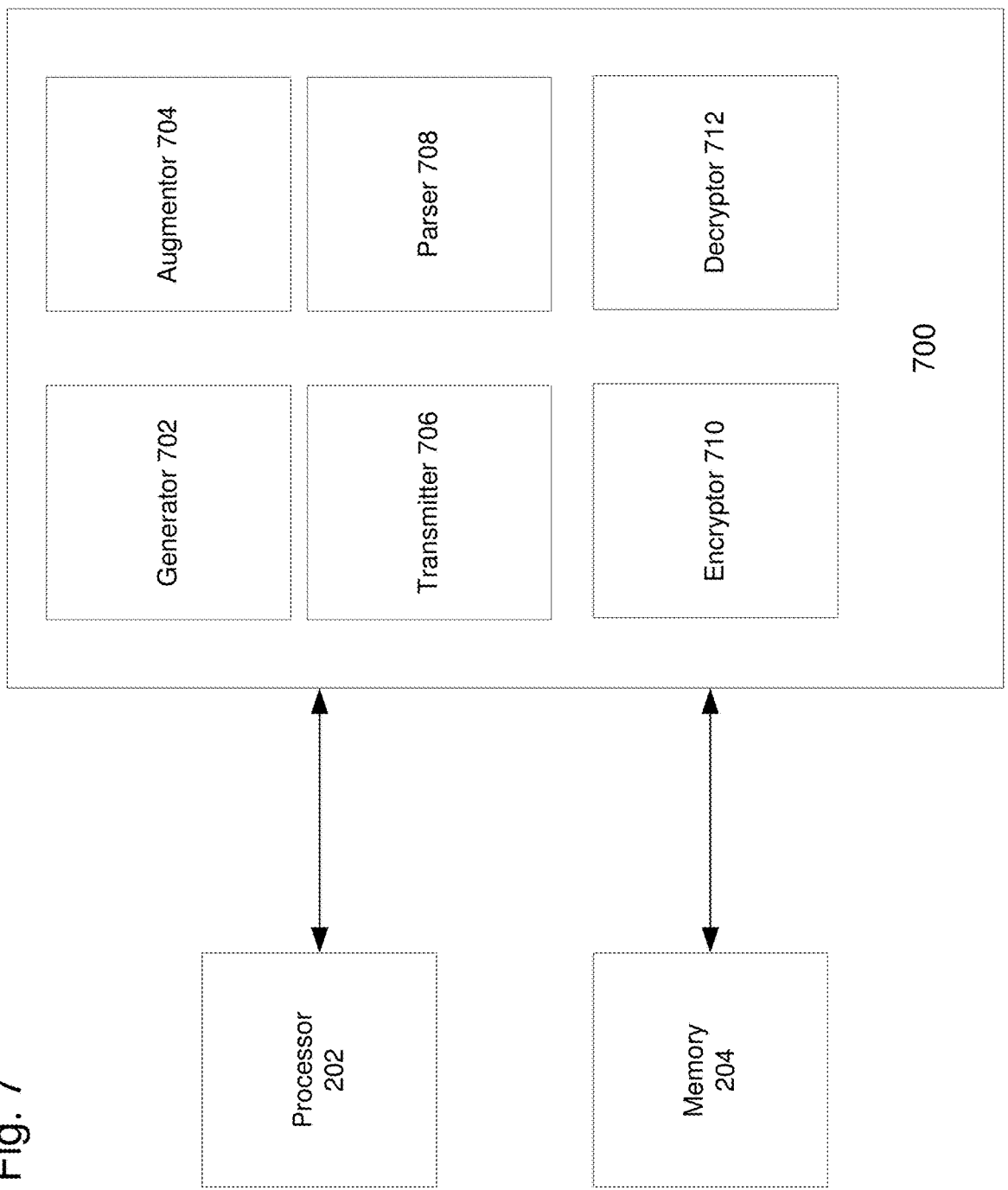

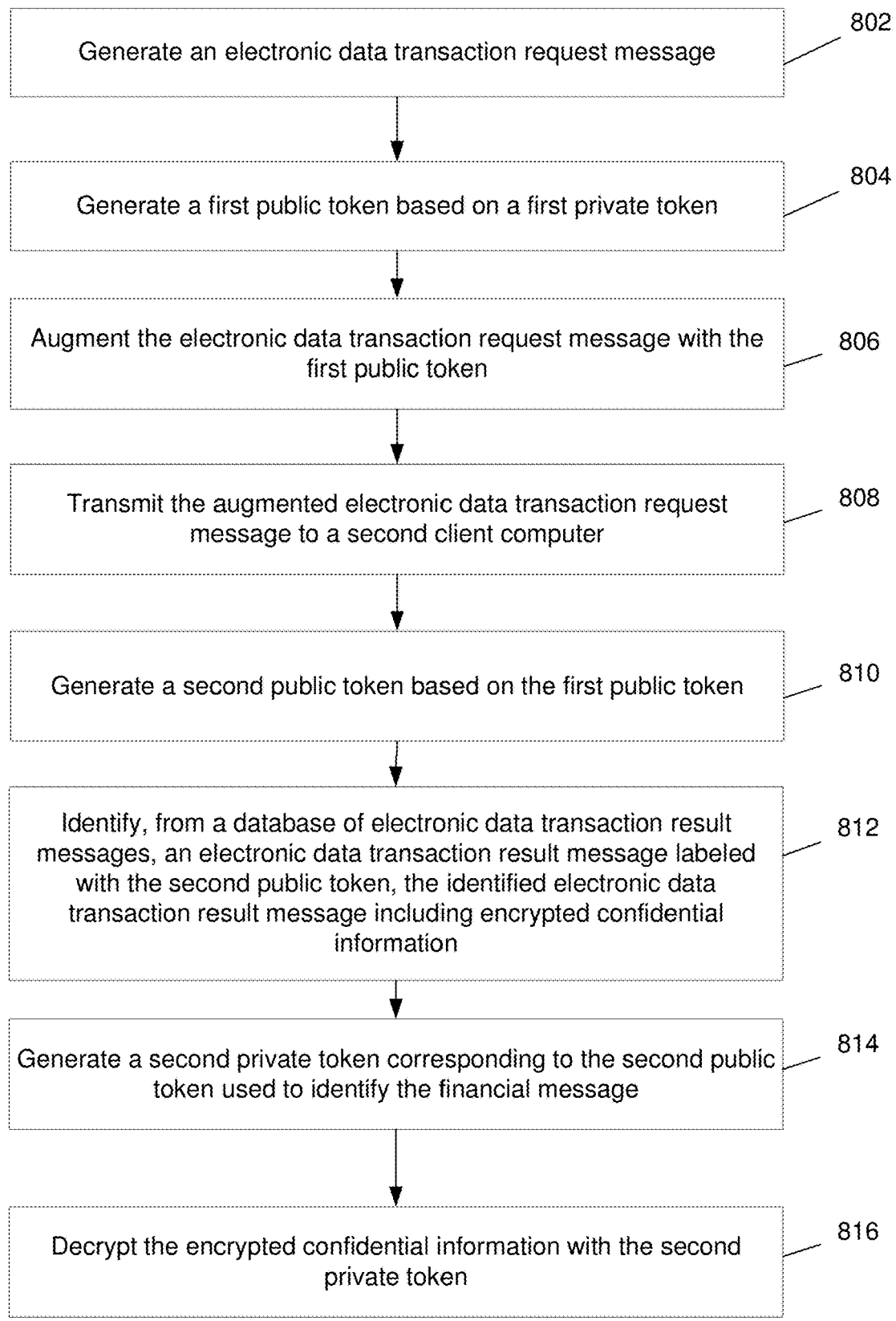

SECURE DETERMINISTIC TOKENS FOR ENCRYPTING ELECTRONIC COMMUNICATIONS

REFERENCE TO RELATED APPLICATIONS

This application claims priority to and the benefit as a continuation of U.S. patent application Ser. No. 17/376,699, filed Jul. 15, 2021, now U.S. Pat. No. 11,663,666, which is a continuation of U.S. patent application Ser. No. 15/981,635, filed May 16, 2018, now U.S. Pat. No. 11,100,578, the entirety of all of which are incorporated by reference herein and relied upon.

BACKGROUND

A financial instrument trading system, such as a futures exchange, such as the Chicago Mercantile Exchange Inc. (CME), provides a contract market where financial instruments, e.g., futures and options on futures, are traded using electronic systems. An exchange computing system may operate under a central counterparty model, where the exchange acts as an intermediary between market participants for the transaction of financial instruments. The exchange computing system receives electronic messages. For example, a market participant may submit an electronic message to the electronic trading system that includes an associated specific action to be undertaken by the electronic trading system, such as entering a new trade order into the market or modifying an existing order in the market. The exchange computing system processes the message and then reports the results of the processing back to the particular market participants impacted by the processing of the message, as well as reports the result to the public via public market data feeds. In other words, the exchange computing system informs market participants about message processing via direct messages sent privately to market participants, as well as through market data feeds that any subscribed, even if not involved in a particular transaction processing, can access. The exchange computing system accordingly generates multiple messages, some direct/private, some public, that often contain overlapping and redundant information.

Electronic trading systems ideally attempt to offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

One manner in which electronic marketplaces attempt to achieve these goals is by equitably providing access to public market information, such as by efficiently disseminating public data, e.g., market data, prices, etc. or changes thereto, to all market participants, and by separating and restricting the communication of private data, e.g., orders and the responses thereto, from that public information. However, as more traders place more trades, the volume of data being communicated increases as well, increasing the burden on the communication infrastructure and supporting resources that are used to generate and transmit the communications in this manner.

Moreover, in many cases, groups of incoming electronic data transaction request messages may be associated with each other, i.e., they are part of some larger order which has been broken up into several orders. This association is not known to the exchange computing system. Accordingly, when the exchange computing system generates reporting messages, the exchange computing system has no way of knowing that different result messages should actually be associated with each other. It becomes the responsibility of the party associated with the large order to keep track of the resulting messages that are associated with each other, or are related.

As the number of parties and business relationships surrounding electronic trading has greatly increased in size and complexity, data flows between parties may become bottlenecked at various stages, or may be reported upstream at different times. One party may have to wait for another to provide a report, which is then incorporated into another report sent upstream. In these cases, many parties are left waiting for information related to their orders. As more parties and business layers become involved in processing larger orders, data is often replicated in multiple locations, which can cause data records that should be identical to be inconsistent, or inaccurate.

In addition, one or more of the parties that processes an order may wish to include confidential information in addition to the result message generated by that party. The party must then separately transmit the confidential information to the recipient of the confidential information. If the confidential information is to be included in the resulting messages (which are made publicly available), the confidential information must be encrypted, and each party that is interested in the reading/viewing the encrypted confidential information must be given a method to decrypt and view the data. In business relationships where parties do not directly interact with each other, but generate information that is relevant to each other, this information must be securely communicated.

Electronic communications over computers and networks, and in particular the ability to easily reproduce and retransmit electronic data, have eliminated direct interaction between parties that communicate information to each other, and have also eliminated control over dissemination of such information. Such information may be sensitive and must be securely communicated, even though the parties do not directly interact with each other.

Accordingly, there is a need in the art to reduce messaging loads on the communication infrastructure and supporting resources that are used to generate and transmit communications among market participants while being able to preserve confidentiality and selectively route important anonymous message association information to the correct market participants, as well as to securely and efficiently transfer confidential information that is related to the otherwise public communications.

BRIEF DESCRIPTION OF THE DRAWINGS

FIG. 6B depicts another system implementing a token management system, according to some embodiments.

FIG. 7 depicts an example block diagram of a token management system, according to some embodiments.

FIG. 8 depicts a high-level flowchart illustrating a computer implemented method for implementing a token management system, according to some embodiments.

DETAILED DESCRIPTION

Figure 1:
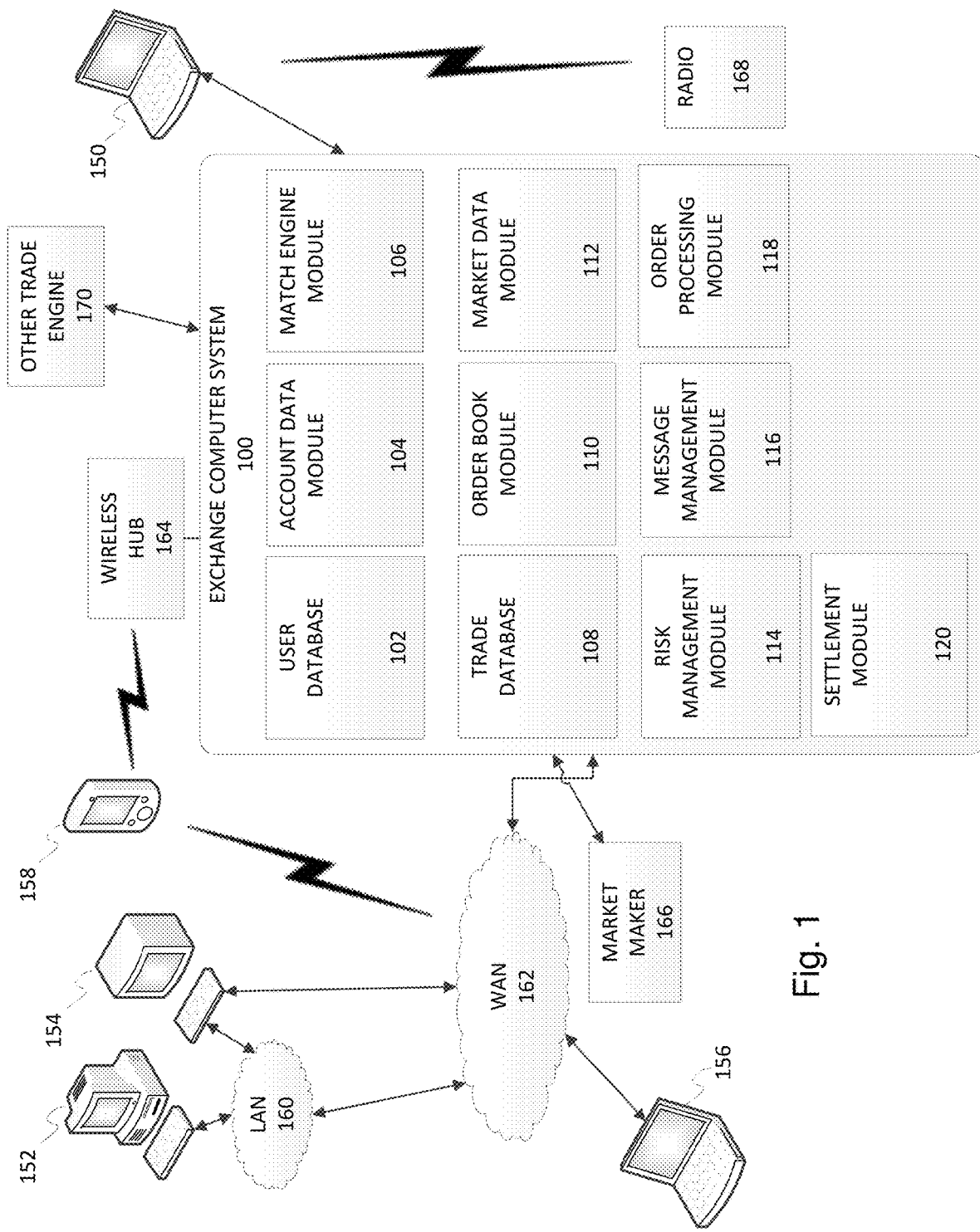
FIG. 1 depicts a computer network system, according to some embodiments.

The disclosed embodiments relate generally to the use of a deterministically reproducible key pair for securely and deterministically transmitting financial messages as well as confidential information associated therewith, where each of the financial messages contains information of interest to a large group of market participants, but the confidential information is intended to be viewed and read by only a subset of those market participants.

The disclosed embodiments also eliminate the need for one or more exchange computing systems to transmit messages directly to a market participant because the financial messages generated by the exchange computing systems include tokens generated by the exchange computing system that only the market participant can associate with each other, regardless of how many intervening parties may divide and further subdivide orders generated by the market participant.

The disclosed embodiments relate to an improvement to the process of reporting confidential information associated with reports of trade activity to market participants, which utilizes a security system which, in one embodiment, may be located at a client computer of each market participant involved in a chain of transactions leading to the submission of an order or electronic data transaction request message to an electronic trading system. Each market participant implementing the disclosed security system can encrypt confidential information for a party upstream, based on tokens as discussed herein which are propagated downstream, until the financial messages are reported/made publicly available in a database that can be queried by upstream market participants.

By allowing the market participants to retrieve, identify and decrypt financial messages based on their own request messages securely, the disclosed embodiments enable parties involved in a multi-party data transfer/transaction to add in confidential information to a result message, or to associate confidential information with a result message, wherein for each portion of confidential information generated by a party, only the appropriate party can decrypt the encrypted confidential information. An exchange computing system, which receives electronic data transaction request message and generates electronic data transaction result message in response thereto, can transmit electronic data transaction result messages, which may include one or more portions of encrypted confidential information, to a universal source that can be used by all market participants and related entities.

The exchange computing system can accordingly eliminate transmission of multiple messages that are identical or contain overlapping/redundant information. In circumstances where market participants are involved in complex business relationships involving many parties with different access rights and obligations, the disclosed embodiments also enable eliminating unnecessary reporting of data because each party/entity can securely and deterministically access relevant data from the universal source, which may be a database or a market data feed. In one embodiment, the universal source may be a blockchain, a distributed ledger, a data aggregation service provider, or another similar data store.

The tokens used to access relevant data, e.g., identify and group messages as discussed herein, can also be used to encrypt confidential information. Accordingly, confidential information does not need to be separately/privately communicated between parties, because the encrypted confidential information can be included in the reporting messages themselves. In one embodiment, the encrypted confidential information can be written to the database separately from the reporting messages.

In this way, redundant communications, e.g., the directed reporting messages, as well as redundant data, may be eliminated, reducing the overall volume of data being communicated and the resources necessary in support thereof. In addition, inhibition of any one market participant intentionally or unintentionally influencing the market via exposure of their activities, or otherwise unfairly impinging on the exposed activities of other market participants, is maintained. Further, inequitable information access is eliminated as the information in the universal source can be made available to all necessary parties at the same time because the data only exists in one equally accessible location, thereby minimizing or eliminating the occurrence of one market participant receiving market information ahead of the other market participants.

If an exchange computing system separates private message generation and transmission from the generation and transmission of corresponding public market data messages, there is the possibility that private data is communicated before, or the transmission thereof otherwise overtakes the transmission of, corresponding public data, thus potentially providing market information to the recipient of the private data prior to other market participants. This prior reception of market information may be an undesirable occurrence due to possible market information imbalances for market participants. If an exchange computing system instead sends financial messages to just one location, e.g., a database agreed by the industry as being the ultimate source of the financial messages, the possibility of a particular market participant receiving messages with private market data prior to other market participants receiving corresponding public market data can be removed, while at the same time, keeping private, highly sensitive data, private. By allowing a market participant to search for anonymized financial messages, securely associate financial messages that are based on that market participant's request messages, and decrypt confidential information included therein, at least some of the disclosed embodiments solve the problem of redundant/overlapping communications from one or more exchange computing systems, which as described above can lead to an overburdening of the network infrastructure as well as can lead to market information imbalances for market participants.

While the disclosed embodiments may be discussed in relation to communications of financial related messages among participants in an electronic trading system, it will be appreciated that the disclosed embodiments may be used for communications among participants where an order or request originating with a market participant is modified and/or divided into multiple orders or requests before being submitted to a data transaction processing system, and where the originating market participant requires securely associating the results of the processing.

For example, where multiple requestors make requests from a system, but each wishes to remain anonymous among all of the other requestors, the system may respond to those requests with a single broadcast message to all of the requestors indicating the status of each request rather than individual response messages. The disclosed embodiments may facilitate such a broadcast message allowing each requestor to know the status of their own request without being able to associate the remaining request statuses with any of the other requestors. Accordingly, with respect to the disclosed electronic trading system embodiment, the term "participant" may refer to a trader, clearing member, market participant, or other user of an electronic trading system and the term "message" may refer to request messages such as orders to trade, e.g., buy or sell, a financial product, requests to modify or cancel previous orders, as well as the response messages thereto, as will be described. However, it will be appreciated that a participant may be any user of a communications system, or may refer to a device used by such as user, and a message, whether requests or responses thereto, may be for any purpose, as described herein.

While the disclosed embodiments may be discussed in relation to futures and/or options on futures trading, it will be appreciated that the disclosed embodiments may be applicable to any equity, options or futures trading system or market now available or later developed. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g., that transactional integrity and predictable system responses are maintained.

The system described in U.S. Patent Publication No. 2013/0218739, filed on Feb. 17, 2012, entitled "Secure Consolidated Exchange Feed For Order Entry And Market Data", assigned to the assignee of the present application, the entirety of which is incorporated by reference herein and relied upon, discloses allocating identifiers by an exchange computing system to a market participant and augmenting messages with the identifiers. See also systems described in U.S. Patent Publication No. 2016/0328796, filed on May 6, 2015, entitled "Tokens, and the use thereof, for public distribution of messages having a private association with a subset of the message recipients", assigned to the assignee of the present application, the entirety of which is incorporated by reference herein and relied upon, discloses creation and dissemination of unique identifiers by an exchange computing system. However, in many cases, as discussed herein, an exchange computing system may not be privy to information about which messages of a plurality of messages are associated together, or are based on a larger order or a common market participant. Moreover, some orders may be divided into smaller orders that are executed by different exchanges, so that no one exchange has enough information to determine all the small orders that are based on one large order. The disclosed embodiments enable market participants and related entities to securely and deterministically identify their own messages while retaining the flexibility to route the orders across multiple parties and execute the orders across multiple exchanges and also while maintaining anonymity and integrity of the systems as discussed herein, which is not well-known, well-understood, conventional or routine. In one embodiment, the financial messages that are securely and deterministically associated with each other are generated by at least two exchange computing systems. By eliminating reliance on identification numbers generated by an exchange computing system, the token management system enables market participants to submit and manage multiple anonymous messages across multiple exchange computing systems, and include encrypted confidential information that can be decrypted only by a party in possession of a private token corresponding to a public token used to encrypt the confidential information, which again is not well-known, well-understood, conventional or routine.

Exchange Computing System

The disclosed embodiments may be implemented in association with a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. Input electronic data transaction request messages may be received from different client computers over a data communication network, and output electronic data transaction result messages may be transmitted to the client computers and may be indicative of results of the attempts to match incoming electronic data transaction request messages. The specifically configured matching processors may additionally generate information indicative of a state of an environment (e.g., the state of the order book) based on the processing, and report this information to data recipient computing systems via outbound messages published via one or more data feeds. While the disclosed embodiments may be described with respect to electronic data transaction request and result messages, it will be appreciated that the disclosed embodiments may be implemented with respect to other technologies later developed, such as photonic, e.g., light-based, messages.

For example, one exemplary environment where the disclosed embodiments may be desirable is in financial markets, and in particular, electronic financial exchanges, such as a futures exchange, such as the Chicago Mercantile Exchange Inc. (CME).

As described above, a financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high-volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different. In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

The disclosed embodiments may be applicable to the use of either an MBP market data feed and/or an MBO market data feed.

Market Segment Gateway

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. Patent Publication No. 2015/0127513 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013 ("the '513 Publication"), the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which determinism may be applied, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see the '513 Publication.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
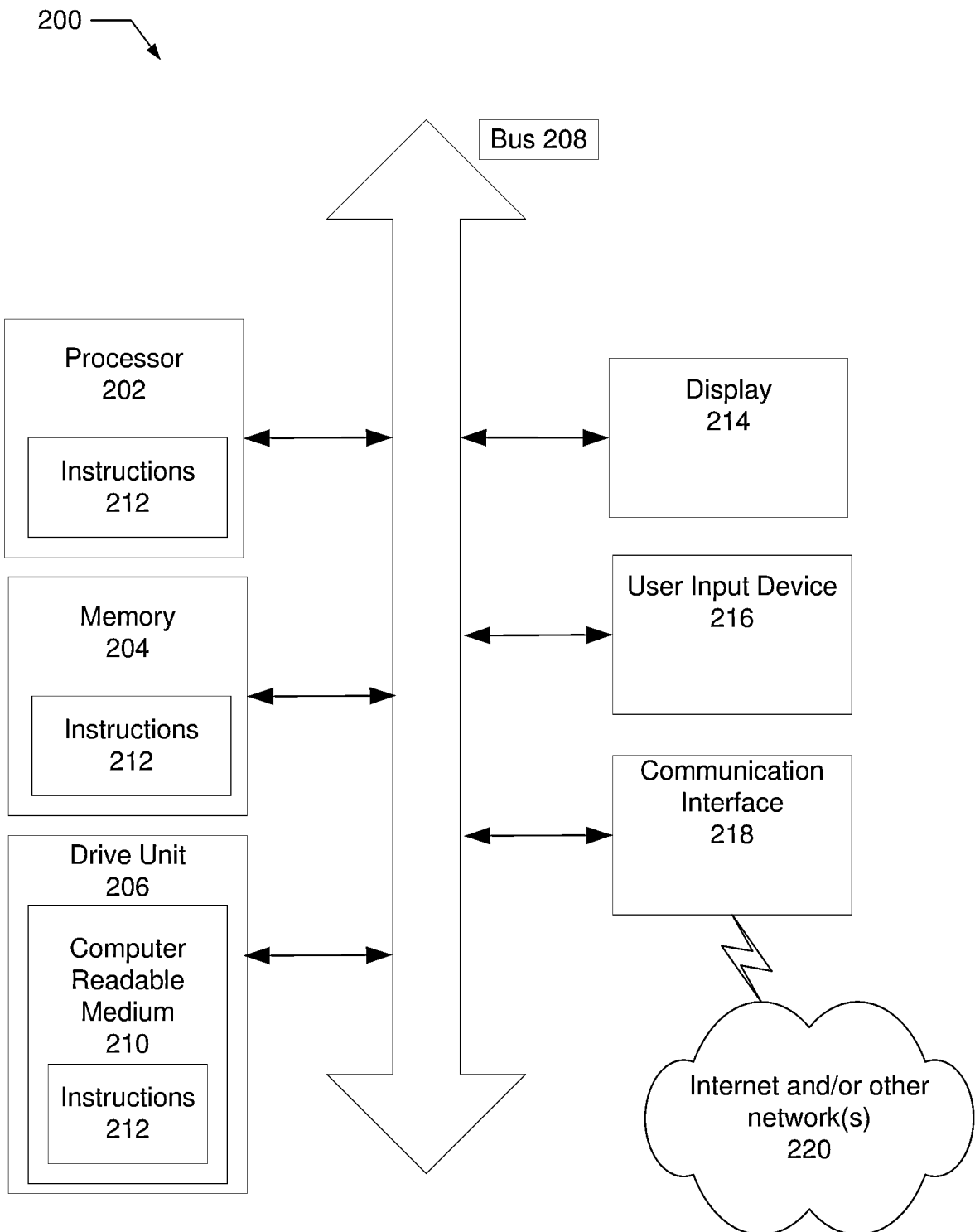
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein may utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time-based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly}=\text{Leg1}-2\times\text{Leg2}+\text{Leg3} \quad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Implication

Thus, an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e., market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g., counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g., the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high-performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counter-offer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

Order Book Object Data Structures

Figure 3A:
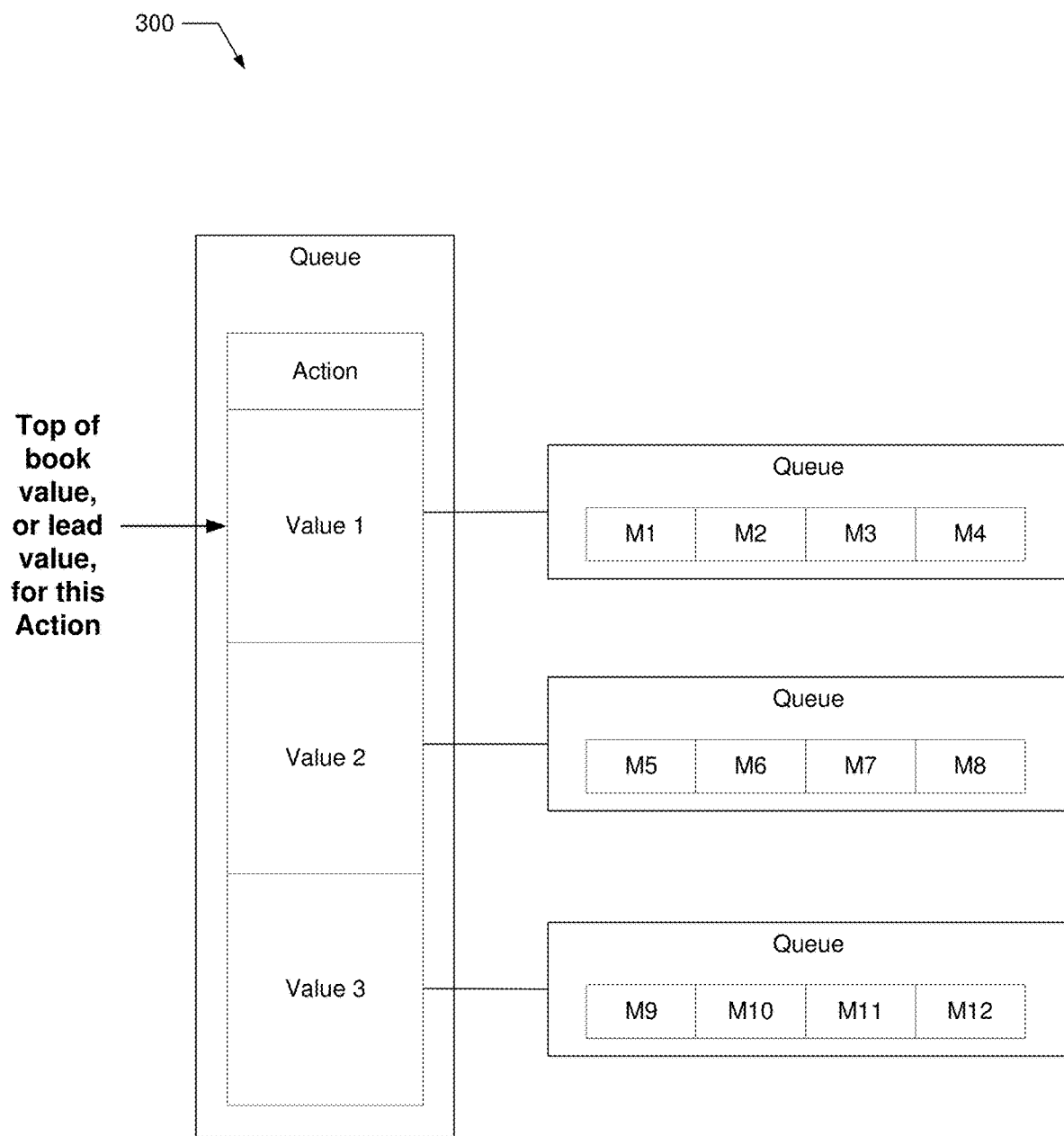
FIG. 3A depicts a storage data structure, according to some embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

A lead acquisition value may be the best or lead value in an acquisition queue of an order book object, and a lead relinquish value may be the best or lead value in a relinquish queue of the order book object.

Figure 3B:
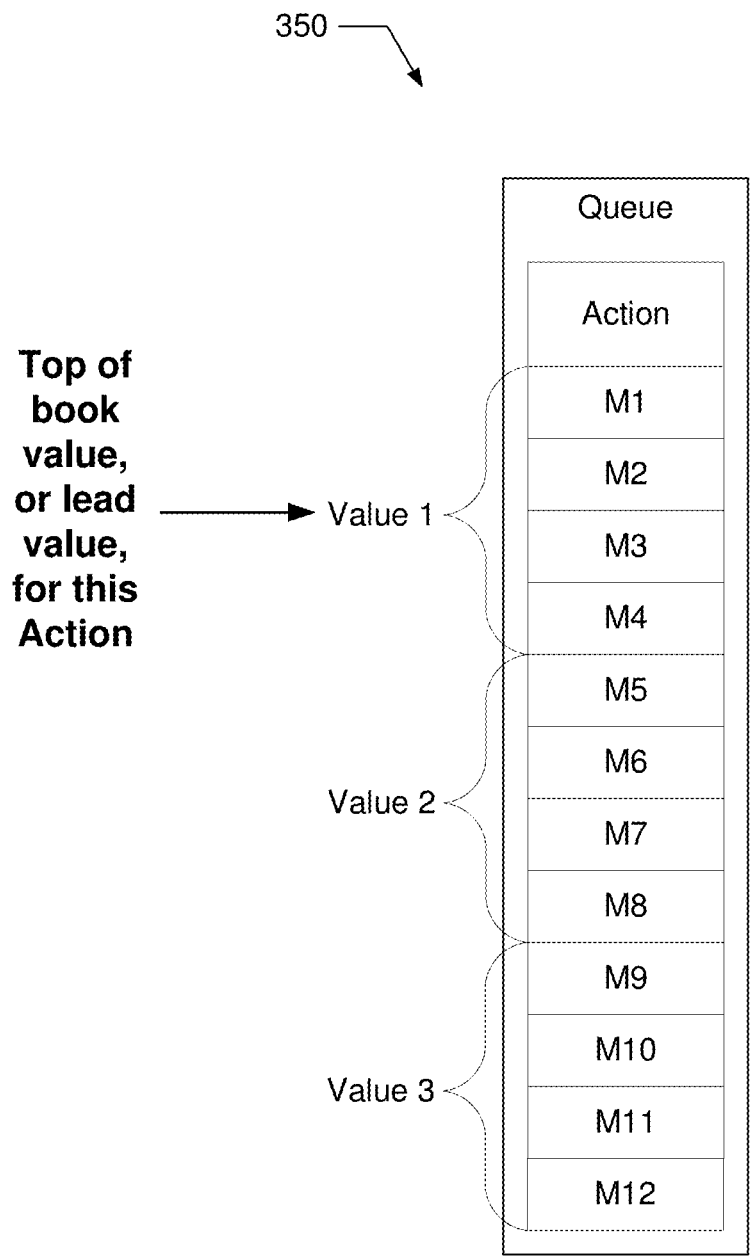
FIG. 3B depicts another storage data structure, according to some embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
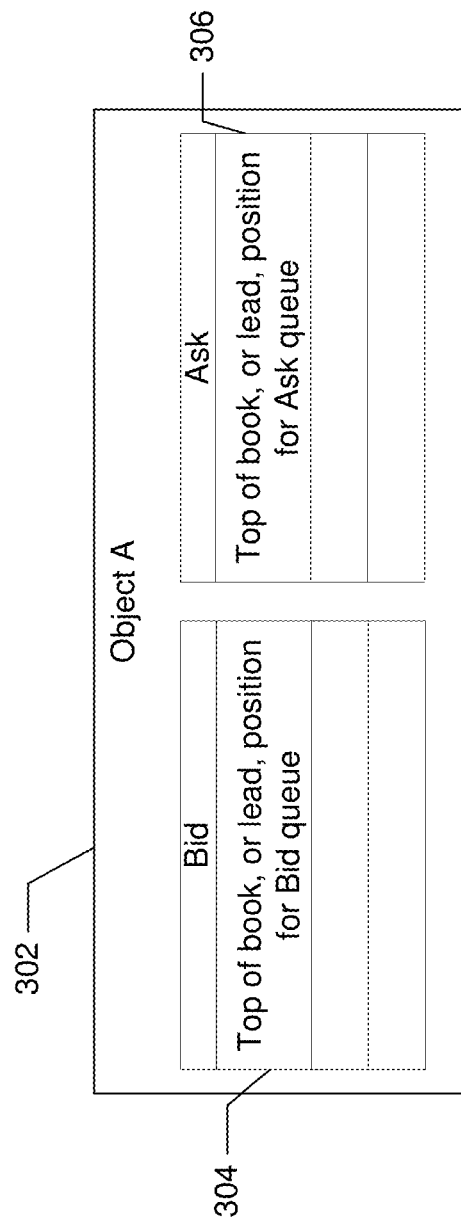
FIG. 3C depicts yet another data structure, according to some embodiments.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

Transaction Processor Data Structures

Figure 4A:
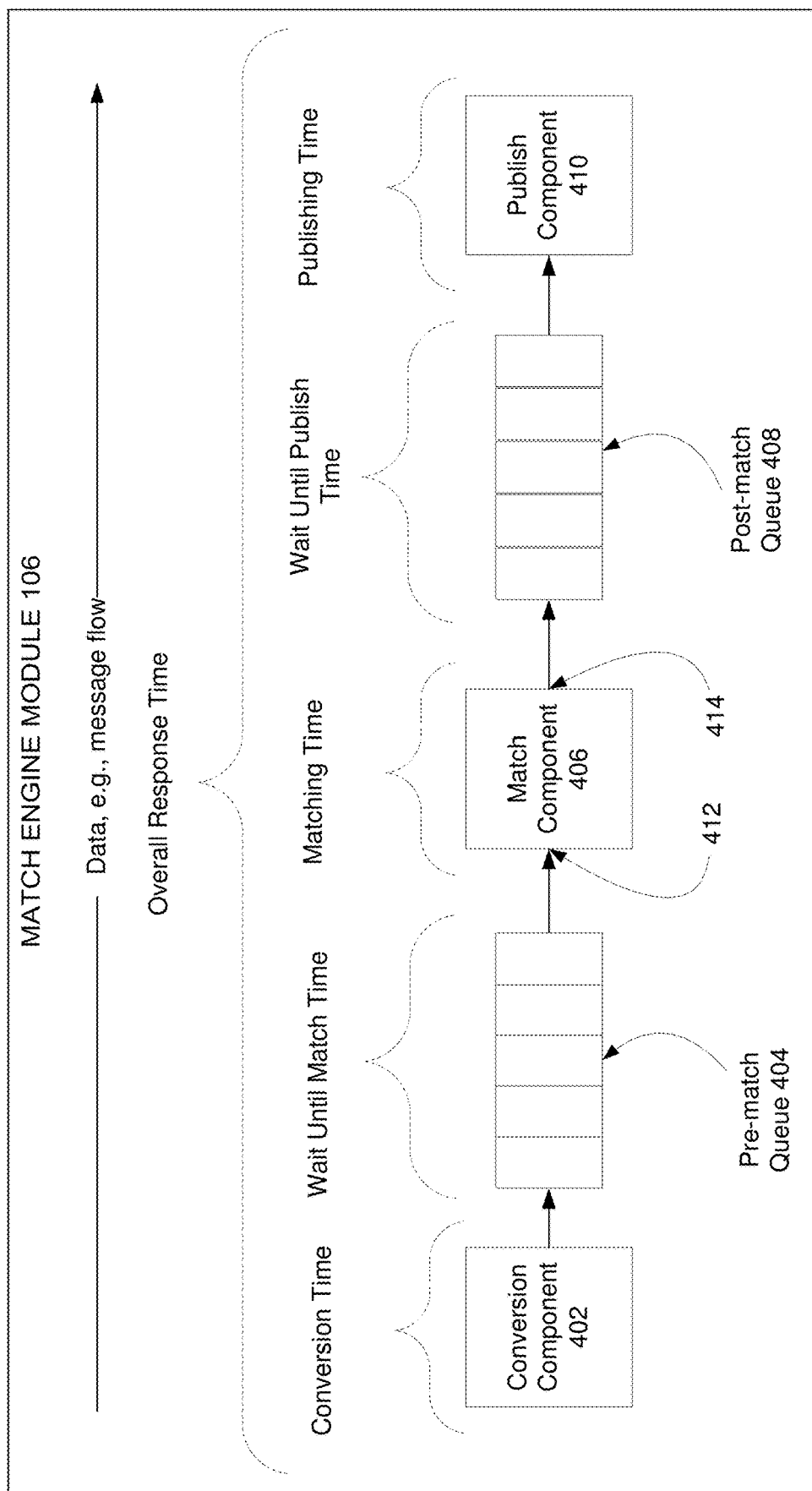
FIG. 4A depicts a match engine module, according to some embodiments.

FIG. 4A illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

Figure 4B:
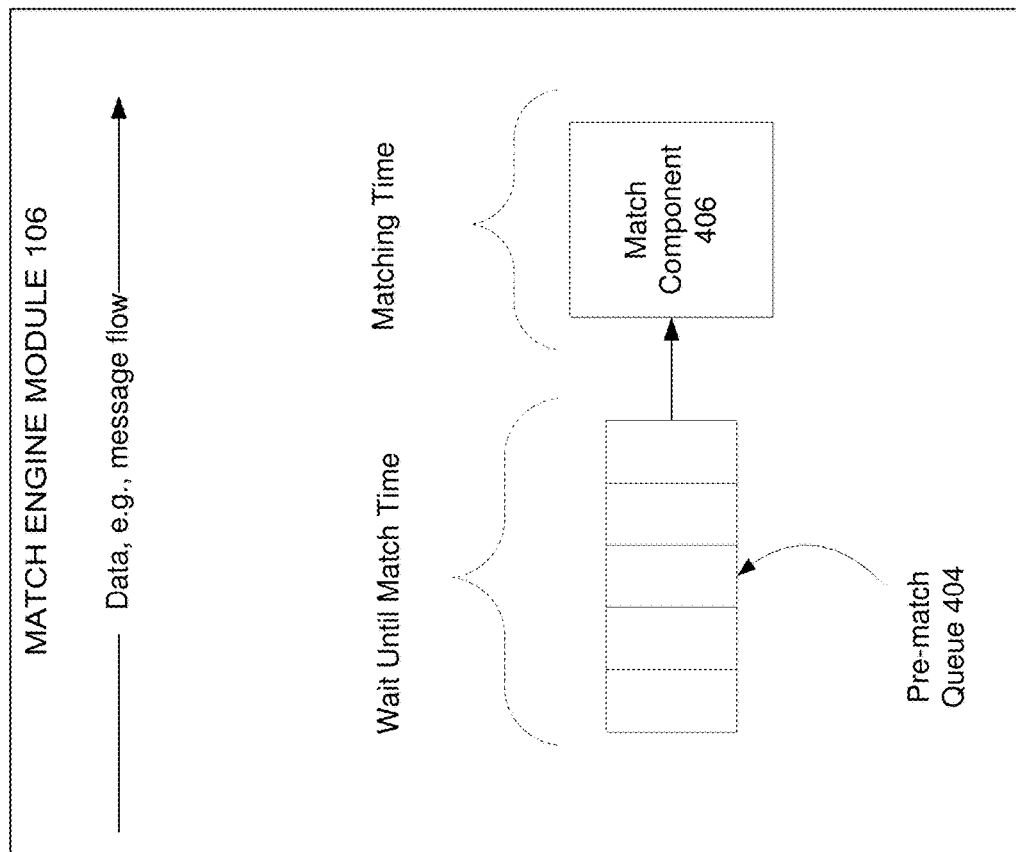
FIG. 4B depicts another match engine module, according to some embodiments.

It should be appreciated that match engine module 106 may not include all of the components described herein. For example, match engine module 106 may only include pre-match queue 404 and match component 406, as shown in FIG. 4B. In one embodiment, the latency detection system may detect how long a message waits in a pre-match queue 404 (e.g., latency), and compares the latency to the maximum allowable latency associated with the message.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4A, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4A, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publicly viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component 402 may be referred to as a conversion time;

Waiting in the pre-match queue 404 may be referred to as a wait until match time;

Being processed or serviced in the match component 406 may be referred to as a matching time;

Waiting in the post-match queue 408 may be referred to as a wait until publish time; and Being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

Hierarchical Deterministic Key Technology

Public-key cryptography, also known as asymmetric cryptography, is a class of cryptographic algorithms which requires two separate keys, one which is secret (or private) and one which is public. Hierarchical Deterministic (HD) key technology is a method for management of public and private elliptic curve keys. HD key technology is based on elliptic curve cryptography. Elliptic curve cryptography is a type of asymmetric or public-key cryptography based on the discrete logarithm problem as expressed by addition and multiplication on the points of an elliptic curve. One example of elliptic curve cryptography is a standard called secp256k1, established by the National Institute of Standards and Technology (NIST). One example use of HD key technology is for bitcoin wallets. A user can use a public key as an address, and can send bitcoin to the address, e.g., mark the bitcoin as spendable by an entity possessing the private key corresponding to the specified public key. For example, a bitcoin address may be a hash of a public key. A bitcoin sender may list a recipient's bitcoin address to specify that the sender wants to send the recipient bitcoin. The recipient derives and uses his/her private key to sign a transaction to spend the bitcoin. Other parties can verify that recipient's signature matches the recipient's private key, which is necessary to prove before the transaction can be added to the bitcoin blockchain. Some Bitcoin wallet programs generates private keys, derives the corresponding public keys, helps distribute those public keys as necessary, monitors for outputs spent to those public keys, creates and signs transactions spending those outputs, and broadcasts the signed transactions.

Figure 5:
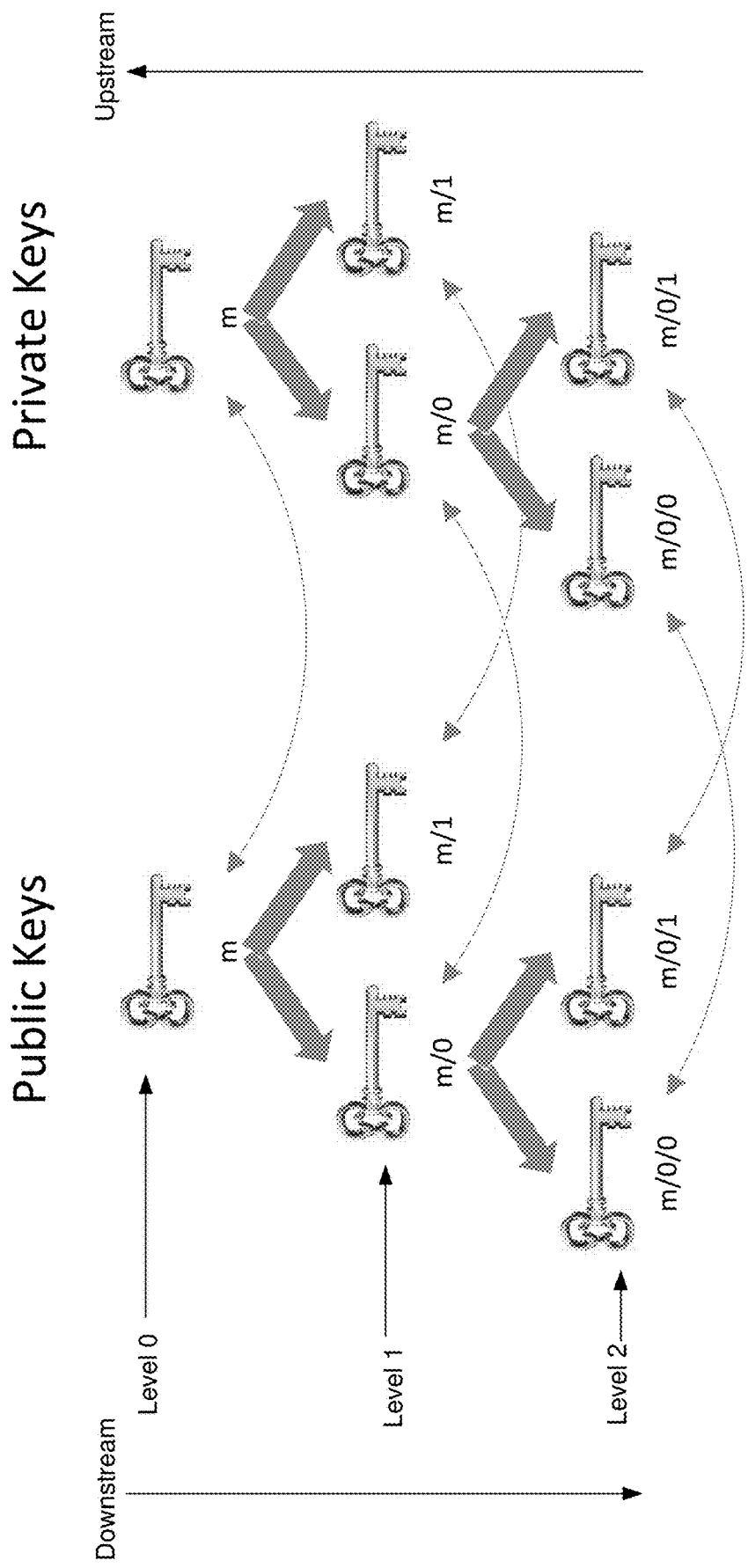
FIG. 5 depicts an example of hierarchical deterministic key cryptography.

For more information on HD key generation, see Bitcoin Improvement Proposal (BIP) 32, the entirety of which is incorporated by reference herein and relied upon. U.S. Pat. No. 9,641,338 B2 and U.S. Pat. No. 9,673,979, the entire disclosures of each of which is incorporated by reference herein and relied upon, also describe hierarchical deterministic key technology. The key pair may be created using elliptic curve cryptography, such as described in Guide to Elliptic Curve Cryptography (Springer Professional Computing) ISBN-13: 978-0387952734, which is hereby incorporated by reference herein in its entirety. A description of techniques and protocols for creating transactions with use of Bitcoin cryptocurrency may be found in the book by Antonopoulos, Andreas M. Mastering Bitcoin: Unlocking Digital Cryptocurrencies, O'Reilly Media, 2014, ISBN 978-1449374044, which is here incorporated by reference in its entirety. A brief description of HD keys, as is known to one having ordinary skill in the art, is provided, and is depicted in FIG. 5. A HD wallet is produced by generating an "extended private key", which may be denoted as m. The extended private key consists of a traditional Elliptic Curve private key, as well as additional data termed the "chain code". From the extended private key, a user can extract just the private key, and derive just the public key, and these two keys operate like any normal private/public key pair in public-private key cryptography.

However, a party with possession of the extended private key m can derive a sequence of extended private keys, named m/0, m/1, m/2, m/3 . . . . These, likewise, consist of a private key plus their own chain code. Knowing, for example, m/0, a user can extract just the private key, or derive just the public key. This new public and private key pair, likewise, operate just like any normal key pair.

It should be noted that it is computationally infeasible to derive a private key from a public key.

Any person possessing extended private key m can determine that the private keys associated with m/0, m/1, m/2, etc. are derived from m. However, any person possessing only extended private key m/0 will be unable to determine that the private key associated with m, or the private keys associated with m/1, m/2, etc. are related.

From an extended private key m, a user can derive an extended public key. The extended public key consists of both the derived public key, as well as the same chain code included with the extended private key. With an extended public key, a user can derive extended public keys for m/0, m/1, m/2, etc. But a user cannot derive any private keys from an extended public key. A party possessing the extended public key for m can easily determine that the public keys for m/0, m/1, m/2, etc. are derived from the extended public key for m. However, someone possessing only the extended public key for m/0 cannot detect that the public key for m, or for m/1, m/2, etc. are in any way related.

Knowledge of extended private key m/0 allows generation of a sequence of extended private keys m/0/0, m/0/1, m/0/2, etc. Knowledge of extended private key m/1 allows generation of a sequence of extended private keys m/1/0, m/1/1, m/1/2, etc. And, likewise, knowledge of extended public key m/0 allows generation of extended public keys for m/0/0, m/0/1, m/0/2, etc. These processes repeat hierarchically, e.g., knowledge of m/0/0 allows generation of m/0/0/0, m/0/0/1, m/0/0/2, and each of these can generate a sequence of keys, etc., resulting in what is essentially an infinite number of keys. However, knowing just one extended private key allows generating a hierarchy of both extended private keys and extended public keys under that extended private key without being able to infer relationships further up (upstream) or sideways (other parties at the same level, not upstream or downstream) within the hierarchical tree diagram. Also, knowing just one extended public key allows generating a hierarchy of extended public keys under that extended public key without being able to infer relationships further up (upstream) or sideways (other parties at the same level, not upstream or downstream) within the hierarchical tree diagram.

Token Management System

As described above, in many instances, the trading of financial instruments involves a chain of transactions involving multiple different parties, where only one of the parties is involved in a direct transaction with the exchange computing system.

Fund managers often make decisions to purchase or sell large quantities of financial instruments, and may do so by dividing the large order into multiple small orders that are sent to amongst multiple different trade desks/brokers, who in turn may submit the smaller orders to the exchange computing system. A large order, for example, may be sent to a trade desk. The large order may be split into many smaller orders, which may further be routed to other parties, traded bilaterally, sent in the form of many small orders to exchanges, routed to algorithmic trading engines that automatically place many small orders which are then sent to markets, etc., e.g., the smaller orders are sent downstream from the large order until the smaller orders are sent to one or more exchange computing systems for execution. Accordingly, an order to purchase a million shares of stock may result in thousands of executions for a few hundred shares. A large order may be divided into smaller orders because knowledge that a fund is purchasing or selling an economically significant quantity (e.g., a large order) of a financial instrument could cause the market to move, resulting in a worse price for the fund. These thousands of executions may be reported via market data feeds, sent to clearing systems on multiple exchanges, reported to various regulatory data repositories or industry utilities or platforms, etc. Often, all these trades bear no connecting information between them. Even the fund manager could not determine whether any given trade was made on behalf of the fund manager's fund without relying on additional information. The fund manager may have no idea who ultimately executed the trades for the fund, and on what exchanges. The parties who executed the trades for the fund often may have no idea of the identity of the ultimate customer, e.g., the fund itself.

Ultimately, a reconciliation process occurs, whereby each party passes on information about trades that they successfully executed to the party that gave them the order, e.g., passes information upstream. Just as the original single order fans out widely with breadth and depth to many participants, information must flow back upstream so that the fund manager ultimately learns what executed and at what prices. Additionally, each party routing orders or executing trades may add fees to the cost of execution. This fee information, likewise, needs to be reported upstream so that parties can be paid, and so that the fund can account for the parties as an expense. Or, a party routing orders or executing trades may generate some other confidential information, e.g., only intended to be read/viewed by a few parties, and not everyone who has access to the financial message database. The reporting process upstream can be slow and cumbersome. A fund manager may not receive information about all of their orders/sub-orders in a timely manner, leaving the fund manager without critical financial information.

HD key technology in a manner compliant with the Bitcoin BIP32 standard for hierarchical deterministic wallets may be implemented as part of a security system installed on a computer of each market participant. In particular, the disclosed embodiments generate tokens for financial messages based on extended private-public key pairs, which are transmitted downstream, and associate, based on the tokens, financial messages to each other that are otherwise unrelated. The security system enables decryption of confidential information that are part of an electronic data transaction result message. The decryption may be based on the tokens used to identify/associated financial messages to each other. The token management system augments a financial message with a token that stays with, i.e., is a part of, the financial message through the life of the financial message, e.g., as the financial message is broken up into a plurality of additional financial messages, and as those plurality of financial messages are ultimately traded on one or more exchange computing systems, and as those exchange computing systems generate additional messages, e.g., reporting messages, whether private/direct or public, responsive to the financial messages. The token management system allows token owners to search for associated tokens, piece together orders that otherwise have no relationships or association from the perspective of any other party and decrypt encrypted confidential information within the order results. In one embodiment, the token management system allows token orders to search for encrypted confidential information based on a token and then decrypt encrypted confidential information based on the token.

Figure 6A:
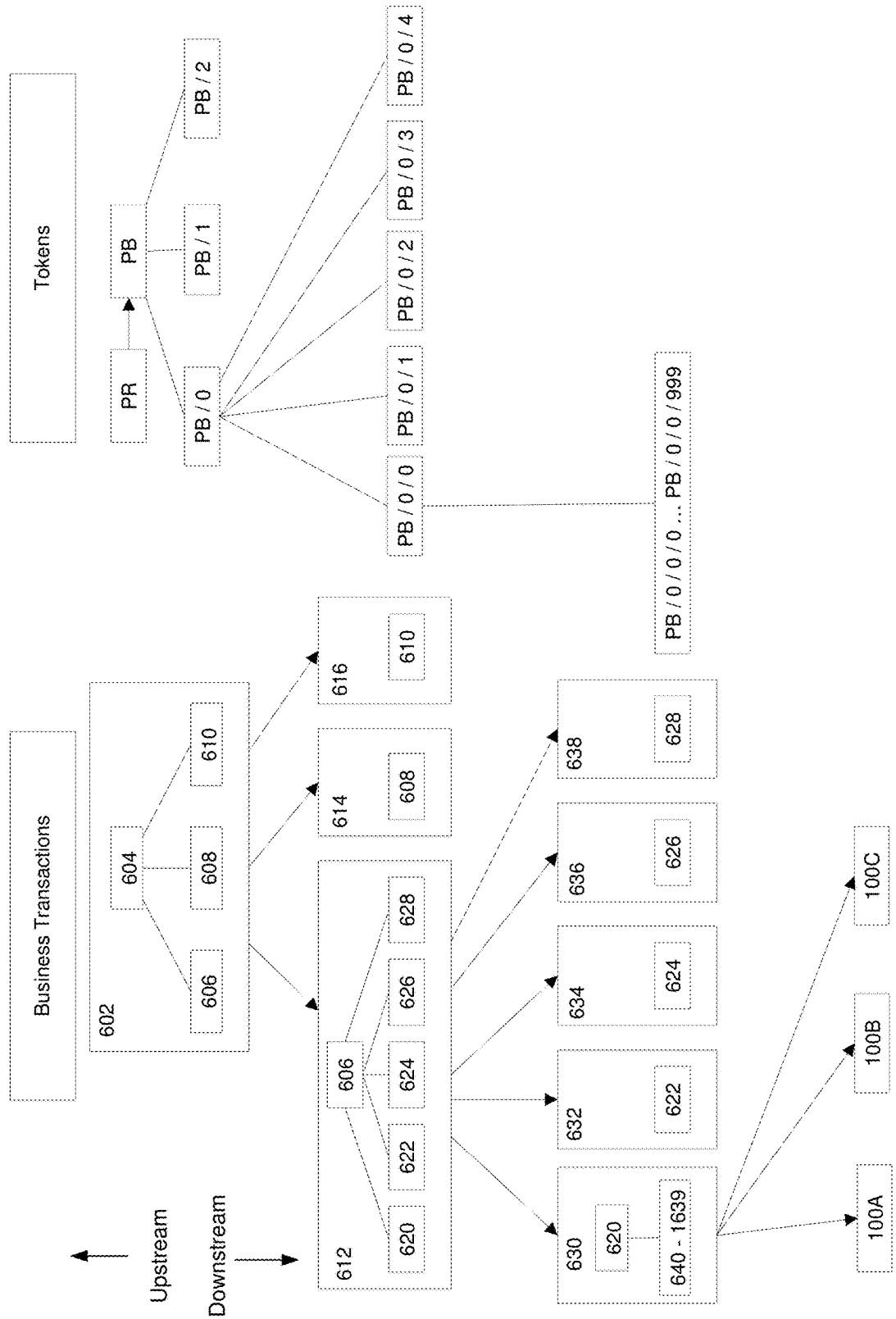
FIG. 6A depicts a system implementing a token management system, according to some embodiments.

FIG. 6A depicts a system 600 which includes multiple parties involved in a series of transactions related to an order which is, in the form of related orders, eventually submitted to one or more exchange computing systems 100A, 100B, 100C, the execution of which is then reported to the public/market participants. The exchange computing systems may be similar to the exchange computing system 100 described above. A fund manager 602 who wishes to execute an order 604 may not wish to directly submit the order 604 to an exchange computing system, and may wish to anonymize the order 604 so no other parties can determine the size (e.g., quantity) and contents of the order 604, e.g., via public market data feeds, for at least some of the reasons described above. Order 604 may be an order to purchase 3 million shares of a financial instrument AAPL. The token management system allows the fund manager to generate an extended private key PR, using the HD key technology described above, for the fund associated with order 604, namely, AAPL. Any order that the fund manager places associated with AAPL uses the extended private key PR as discussed herein. Because the private key PR can be used to derived extended private keys and extended public keys, the private key PR should be safeguarded, e.g., in a hardware security module (HSM).

The fund manager 602 may decide to break up or divide order 604 into a plurality of orders 606, 608, and 610, and send the orders 606, 608 and 610 to three different trade desks 612, 614, and 616. The token management system generates three extended private keys PR/0, PR/1 and PR/2 that are derived from extended private key PR. The token management system also extracts three extended public keys, PB/0, PB/1, and PB/2, corresponding to the extended private keys PR/0, PR/1 and PR/2, respectively. The extended public keys PB/0, PB/1, and PB/2 are augmented to the orders 606, 608 and 610, respectively. As noted above, orders 606, 608 and 610 are sent to trade desks 612, 614, and 616, respectively.

For example, order 606, which is a subset of, or an order based on, order 604 may be an order to purchase 1 million shares of the financial instrument AAPL. The trade desk 612 which receives order 606 may also include a computer having installed thereon the token management system. The token management system installed on a particular computer within system 600 may be referred to as a token management system instance. The token management system associated with trade desk 612 detects that order 606 includes an extended public key PB/0. Trade desk 612 may decide to further divide the order 606 into a plurality of orders 620, 622, 624, 626, and 628, each for 200,000 shares of the financial instrument AAPL. Trade desk 612 uses the token management system to generate extended public keys PB/0/0, PB/0/1, PB/0/2, PB/0/3, PB/0/4. The token management system augments orders 620, 622, 624, 626, and 628 with extended public keys PB/0/0, PB/0/1, PB/0/2, PB/0/3, PB/0/4, respectively. Orders 620, 622, 624, 626, and 628, augmented with their extended public keys, are sent to brokers 630, 632, 634, 636 and 638, respectively.

The first broker, 630 in this example, may operate an algorithmic trading engine. Broker 630's algorithmic trading engine may be configured to send orders to various exchanges at different times, depending on market conditions and other trading logic incorporated into the trading engine. For example, broker 630's trading engine may divide order 620 into 1000 orders, e.g., orders 640 to 1639, of 200 shares each of AAPL to various exchanges 100A, 100B, and 100C. The token management system instance on the computer of broker 630 may detect that order 620 includes an extended public key PB/0/0. Broker 630 uses the token management system to generate extended public keys PB/0/0/0, PB/0/0/1, PB/0/0/2, PB/0/0/3, . . . PB/0/0/999. The token management system augments orders 640, 641, 642, 643, . . . 1639 with extended public keys PB/0/0/0, PB/0/0/1, PB/0/0/2, PB/0/0/3, . . . PB/0/0/999, respectively. Orders 640, 641, 642, 643, . . . 1639 augmented with their extended public keys, to the various exchanges for execution.

As the various exchange execute the 640, 641, 642, 643, . . . 1639 orders, the exchanges carry on the tokens or extended public keys PB/0/0/0, PB/0/0/1, PB/0/0/2, PB/0/0/3, . . . PB/0/0/999, respectively. The exchange computing systems may place the tokens in their reports of the trades being executed, e.g., in their market data feeds, in their clearing database, in reports made to trade repositories, or industry utilities facilitating settlement, such as an industry approved database or data repository agreed by market participants to be the ultimate and undisputed record of transactions.

For example, all market participants may agree to not dispute the veracity of records that are written to an industry approved universal source, which may be a permissioned database to which only trusted institutions may have the ability to write or modify data. All of the exchange computing systems that facilitate trading, matching and clearing of financial instruments would simply have to write their match results, e.g., financial messages, in the universal source. Exchange computing systems would not need to send market data feeds to market participants, and would also not need to send direct messages to market participants. Interested market participants could then query the universal source for relevant data. However, such a universal source would require a methodology by which market participants would be able to identify financial messages related to their orders. For example, a market participant would be interested in just the results/financial messages for his or her orders to purchase shares of a financial instrument, but would not be interested in results/financial messages for all orders to purchase shares of that financial instrument.

Upon generating and disseminating orders augmented with an extended public key, the token management system then generates extended public keys that are derived from the disseminated extended public key. For example, the token management system on the fund managers 602's computer transmits orders 606, 608 and 610, augmented with extended public keys PB/0, PB/1, and PB/2, respectively. The token management system then generates the next (lower) level of extended public keys, and searches public data sources for extended public keys based on each of PB/0, PB/1, and PB/2. For example, the token management system generates, and searches market data feeds for reporting messages including, tokens derived from PB/0, e.g., PB/0/0, PB/0/1, PB/0/2, PB/0/3, PB/0/4. The token management system also generates, and searches market data feeds for reporting messages including, tokens derived from PB/1, e.g., PB/I/O, PB/1/1, PB/1/2, PB/1/3, PB/1/4. Any order reporting messages that include any of the extended public keys based on PB can be collected and grouped by fund manager 602 as being an order for financial instrument AAPL that was originated with the fund manager 602. The fund manager 602 can accordingly observe the process of execution of the order 604, no matter how that order is divided/anonymized by fund manager 602 or any of the parties downstream of fund manager 602, without waiting for identifying information regarding the trades to make its way upstream to the fund manager 602.

Similarly, trade desk 612's token management system can also search the public databases for orders with tokens based on PB/0/0. Any order reporting messages that include any of the extended public keys based on PB/0/0 can be collected and grouped by trade desk 612 as being an order associated with order 620. The trade desk 612 can accordingly observe the process of execution of the order 620, no matter how that order is divided/anonymized by trade desk 612 or any of the parties downstream of trade desk 612, without waiting for identifying information regarding the trades to make its way upstream to the trade desk 612.

It should be appreciated that all of the parties involved in orders that have tokens associated therewith should be in agreement to use the disclosed token management system. Each of the parties should agree to, upon receiving an order having an associated HD token, to derive the next/lower level (e.g., downstream) of HD tokens, and use the tokens on orders distributed downstream. Moreover, all of the parties should agree to use the same cryptographic scheme, such as the HD key cryptography scheme described herein, so that other parties can generate and search for the appropriate keys.

Accordingly, the fund manager 602 can generate a group of orders that are related to each other, and transmit the orders to other parties such as the trade desks 612, 614, and 616, who in turn can further transmit the orders to other parties such as brokers 630, 632, 634, 636, and 638, where each transmission may divide and change the size of the orders, and the association of the financial messages resulting from the orders which have been divided by a party is only discernable to that party. In other words, the token management system enables a market participant to determine an association between related financial messages that is not otherwise discernable to any other market participant involved in the generation of the financial messages.

In one embodiment, the implementation of the HD key technology allows a party to generate and disseminate public HD keys instead of extended public HD keys. A party that receives an extended public HD key can derive additional keys (e.g., for transmission downstream) for dissemination. In contrast, a party that receives a public HD key cannot derive additional keys (e.g., for transmission downstream) for dissemination, but may instead be able to use the public HD key as an identifier, or for encryption of confidential information as discussed herein. Accordingly, a key sending party transmits an extended public HD key when that sender wants the recipient to be able to generate additional (derived) keys from the extended public HD key.

Although the example associated with FIG. 6A describes that the fund manager 602 has possession of the private key PR, the fund manager 602 may itself receive an extended public key from a party upstream, i.e., the firm for whom the fund manager 602 works. The number of hierarchical levels involved in the business transaction can vary and is implementation dependent. Using the HD key technology as discussed herein, the token management system allows parties to receive tokens from one or more parties upstream, generate additional tokens therefrom, transmit the additional tokens downstream, and thereafter search for other tokens that can be derived therefrom.

U.S. patent application Ser. No. 15/856,699, filed on Dec. 28, 2017, entitled "Secure Deterministic Tokens for Electronic Messages", assigned to the assignee of the present application, the entirety of which is incorporated by reference herein and relied upon, describes a token management system that securely and deterministically associates multiple financial messages with each other that have a relationship, without conveying the existence of the relationship to market participants not associated with the financial messages.

Encryption for Token Management System

In a system involving multiple transactions between multiple parties, where the end result of the system may be made publicly available, e.g., via data feeds or a data source, at least some of the data transferred/generated may be considered confidential, i.e., not intended to be shared publicly with all the users who have access to the data feeds or the data sources. The disclosed token management system allows a party in the transaction chain to encrypt confidential/private information associated with a request message, and then augment the request message with the confidential information, so that the encrypted confidential information appears within a financial message, wherein the financial message reports on the results of processing the request message. In one embodiment, the encrypted confidential information may be transmitted to a universal source separately from the electronic data transaction result message which includes the results of the matching/processing performed by the exchange computing system. The financial message, which may include the encrypted confidential information, is made publicly available, e.g., via market data feeds or a universal data repository. The disclosed token management system allows an entity to locate financial messages associated with that entity's request messages, and decrypt the confidential information associated with the financial message. In one embodiment, an entity decrypts the financial message using a portion of the label used to locate/identify the financial message from the data feed or data source.

For example, referring back to FIG. 6A, trade desks 612, 614, and 616 may each process a portion of the order 604. Each trade desk may generate confidential information in connection with processing a portion of the order 604. For example, each trade desk may charge a fee to the fund manager 602 for executing orders 606, 608, and 610, respectively. Trade desk 612 may charge fund manager 602 a fee 612A, trade desk 614 may charge fund manager 602 a fee 614A, and trade desk 616 may charge fund manager 602 a fee 616A. These fees may be confidential, so that only fund manager 602 should be able to see the fees being charged to fund manager 602 by any of the trade desks. Trade desk 612 should not be able to see the fee 614A charged by trade desk 614.

Moreover, broker 630, who receives order 620 from trade desk 612 as described above, may divide order 620 into 1000 orders, e.g., orders 640 to 1639, of 200 shares each of AAPL. Broker 630 may charge a fee 630A to trade desk 612. Order 640, augmented with extended public key PB/0/0/0, may be sent to exchange computing system 100A. As discussed herein, token PB/0 is a public key corresponding to private key PR/O, which is in the possession of entity 602. Exchange computing system 100A may charge a fee 100AA to broker 630.

It should be appreciated that the confidential information being generated may be something other than the fee, e.g., each party downstream of a party may generate some additional private information (related to the processing of the tasks that have been assigned to that downstream party by the upstream party) that needs to be privately communicated to the party upstream.

The disclosed embodiments include encrypting confidential information, such as order execution fees, but may be any other confidential information, i.e., not intended to be publicly available, augmenting financial messages with the encrypted confidential information, publicizing the augmented financial messages, and upon identifying augmented financial messages associated with a label, decrypting the encrypted confidential information using a key based on the label.

As described above, a party in the business transaction chain receives a task or an order, as well as a token to be associated with the performance of that task, such that the results of the performance can be retrieved, from a public database, by the task-giver based on the token, without the task-performer having to specifically, privately report the completion/performance of the task to the task-giver. Each entity that processes a task (i.e., a task-performer) and that generates confidential information associated with processing the task also encrypts the confidential information using the token provided by the entity upstream (i.e., a task-sender) that sent the task to the task-performer.

For example, trade desk 612 may encrypt the fees associated with executing order 606, namely, fees 612A, using the public key associated with order 606, namely, PB/0. This encrypted confidential information is then included along with information about order 606 as order 606 is propagated downstream, e.g., to brokers 630, 632, 634, 636 and 638. The encrypted confidential information remains associated with the execution of order 606, so that eventually, when one or more exchange computing systems generates financial messages reporting on the execution of order 606, the encrypted fees 612A remain associated with the order 606. Because only the fund manager 602 has knowledge of private key PR/0 corresponding to public key PB/0, only the fund manager 602 can decrypt the encrypted confidential information.

It should be appreciated that multiple other entities may also be involved in executing order 606, e.g., entities 630, 632, 634, 636 and 638. Each of these entities may charge a fee, e.g., 630A, 632A, 634A, 636A and 638A, respectively, to the trade desk 612, which may be considered confidential information and should only be viewable by trade desk 612 and any party upstream of 612, such as 602. This confidential information is accordingly encrypted by each entity using the public key provided to that entity by trade desk 612. In the example of FIG. 6A, entity 630 encrypts fee 630A using the key PB/0/0 provided to entity 630 by its upstream entity 612, entity 632 encrypts fee 632A using the key PB/0/1 provided to entity 632 by its upstream entity 612, entity 634 encrypts fee 634A using the key PB/0/2 provided to entity 634 by its upstream entity 612, entity 636 encrypts fee 636A using the key PB/0/3 provided to entity 636 by its upstream entity 612, and entity 638 encrypts fee 638A using the key PB/0/4 provided to entity 638 by its upstream entity 612. Each of these entities then adds the encrypted confidential information to the message/order that is transmitted downstream.

An exchange computing system, such as exchange computing system 100A, that processes the message/order will then report the results of the processing in the form of financial messages. The exchange computing system will include encrypted confidential information associated with a request message in the financial message resulting from processing the request message. The exchange computing system may also charge a fee for processing a request message. The exchange computing system's fee may also be encrypted in the resulting financial message using the methods described herein.

Accordingly, a resultant financial message (generated by an exchange computing system, such as exchange computing system 100A) includes encrypted confidential information. The encrypted confidential information may include encrypted confidential information generated by different entities, where each entity encrypts its confidential information with a different encryption key. A financial message that is responsive to order 604 may include non-confidential information, such as the results of placing order 604, which should be viewable by any entity subscribing to the appropriate market data feeds, as well as confidential information, such as the fees charged by various entities, which should only be viewable by the entities that are being charged the fees and any entities upstream of those entities. Each entity that is involved with placing order 604 may then be able to query the market data feed, locate the financial messages associated with that entity (using the token management system described herein), and can then further decrypt the appropriate portion of the encrypted confidential information using the private key corresponding to the public key generated by that entity, wherein the public key is used to encrypt the information relevant to that specific entity. It should be appreciated that an entity would need to be provided the private key corresponding to a public key, or would need to be able to derive the private key corresponding to a public key, as described herein.

FIG. 6B illustrates a data flow diagram illustrating an example data flow between some of the entities described in connection with FIG. 6A. As discussed in FIG. 6A, order 604 may be divided into smaller orders (e.g., suborders that are associated with a smaller quantity request) by one or more entities downstream as the order propagates downstream, e.g., towards an exchange computing system, where it is eventually processed, e.g., matched. Reference numerals and/or element numbers that appear in both FIGS. 6A and 6B, e.g., 602, 612, 630, 100A, 604, 606, 620, 640, should be understood to be referring to the same elements.

FIG. 6B illustrates portions of order 604 as they are transmitted from fund manager 602 to trade desk 612, to broker 630, to exchange computing system 100A, which processes the order(s) and reports the results of the processing via market data feed and/or via a universal data source 650. The market data feed and/or universal data source 650 can be queried by one or more of fund manager 602, trade desk 612, broker 630, as discussed herein.

At step S1, entity 602 divides order 604 into a plurality of orders including order 606. (Other suborders of order 604 illustrated in FIG. 6A, such as orders 608 and 610, are not illustrated in FIG. 6B.) The token management system instance installed on a computer associated with entity 602 assigns token PB/0 to order 606. At step S2, order 606, along with its token PB/0, is transmitted downstream to entity 612.

At step S3, entity 612 divides order 606 into a plurality of orders including order 620. (Other suborders of order 606 illustrated in FIG. 6A, such as orders 622, 624, 626, and 628, are not illustrated in FIG. 6B.) Entity 612 may also generate confidential information 612A associated with order 620, which may be intended to be viewed/read by entity 602. Confidential information 612A may be intended to be viewed/read by entity 602 after, or when, order 606 is eventually processed by exchange computing system 100A. In other words, it may not be desirable or useful to communicate the confidential information 612A separately to entity 620 before order 606 is processed by the exchange computing system. Entity 612 includes information 612A with order 620 when order 620 is transmitted downstream. Because information 612A is confidential, the token management system instance installed on a computer associated with entity 612 encrypts confidential information 612A using the token PB/0 provided by entity 602, such encryption being denoted in FIG. 6B as PB/0_612A. Entity 612's token management system instance assigns token PB/0/0, derived from PB/0, to order 620. At step S4, order 620, encrypted confidential information PB/0_612A, and token/label PB/0/0 are transmitted downstream to entity 630.

At step S5, entity 630 divides order 620 into a plurality of orders including order 640. (Other suborders of order 620 illustrated in FIG. 6A, such as orders 641 to 1639, are not illustrated in FIG. 6B.) Entity 630 may also generate confidential information 630A associated with order 640, which may be intended to be viewed/read by entity 612. For example, confidential information 630A may be fees that entity 630 will charge to entity 612. The token management system instance installed on a computer associated with entity 630 accordingly encrypts confidential information 630A using the token PB/0/0 provided by entity 612, such encryption being denoted in FIG. 6B as PB/0/0_630A. Entity 612's token management system instance assigns token PB/0/0/0, derived from PB/0/0, to order 640. At step S6, order 640, encrypted confidential information PB/0_612A, encrypted confidential information PB/0/ 0_630A, and token/label PB/0/0/0 are transmitted downstream to entity 100A, which is an exchange computing system.

Entity 100A processes order 640 and generates electronic data transaction result message FM1, as shown at step S7. Entity 100A may also generate confidential information 100AA associated with order FM1. The token management system instance installed on a computer associated with entity 100A accordingly encrypts confidential information 100AA using the token PB/0/0/0 provided by entity 630, such encryption being denoted in FIG. 6B as PB/0/0/ 0_100AA. FM1 is labeled by entity 100A's token management system instance using the token provided by the upstream entity 630, namely, token/label PB/0/0/0. Entity 100A then publishes FM1, which includes encrypted confidential information PB/0_612A, encrypted confidential information PB/0/0_630A, and encrypted confidential information PB/0/0/0_100AA, and which is labeled with token/label PB/0/0/0, to the data source/data feed 650, as shown at step S8.

The token management system instance of each of the upstream entities 602, 612, and 630 can query the data source 650 to determine whether orders 606, 620 and 640, respectively have been processed by the exchange computing system 100A. In particular, each entity may implement the described token management system, so that an entity that transmits an extended public key downstream can derive public keys (whether they are extended public keys or not) that are derived/used by other parties downstream based on the transmitted extended public key. For example, entity 602's token management system instance can derive the FM1 label PB/0/0/0 from PB/0, and entity 612's token management system instance can derive the FM1 label PB/0/0/0 from PB/0/0. Entities 602 and 612 would accordingly search the data source 650 for financial messages having the PB/0/0/0 label, and be able to associate such financial messages with their orders 606 and 620, respectively.

The disclosed embodiments also enable different entities to decrypt different portions of financial messages, as long as those entities are provided with a mechanism for deriving the private key corresponding to the public key used for the encryption. For example, although each of entities 602, 612, and 630 can locate FM1 from data source 650, entity 630's token management system instance can only decrypt encrypted confidential information PB/0/0/0_100AA (because entity 630 has access to/can derive PR/0/0/0), whereas entity 612's token management system instance can decrypt encrypted confidential information PB/0/0/0_100AA and PB/0/0_630A (because entity 612 has access to/can derive PR/0/0/0 and PR/0/0), and entity 602's token management system instance can decrypt encrypted confidential information PB/0/0/0_100AA, PB/0/0_630A and PB/0_612A (because entity 602 has access to /can derive PR/0/0/0, PR/0/0 and PR/0).

Figure 6C:
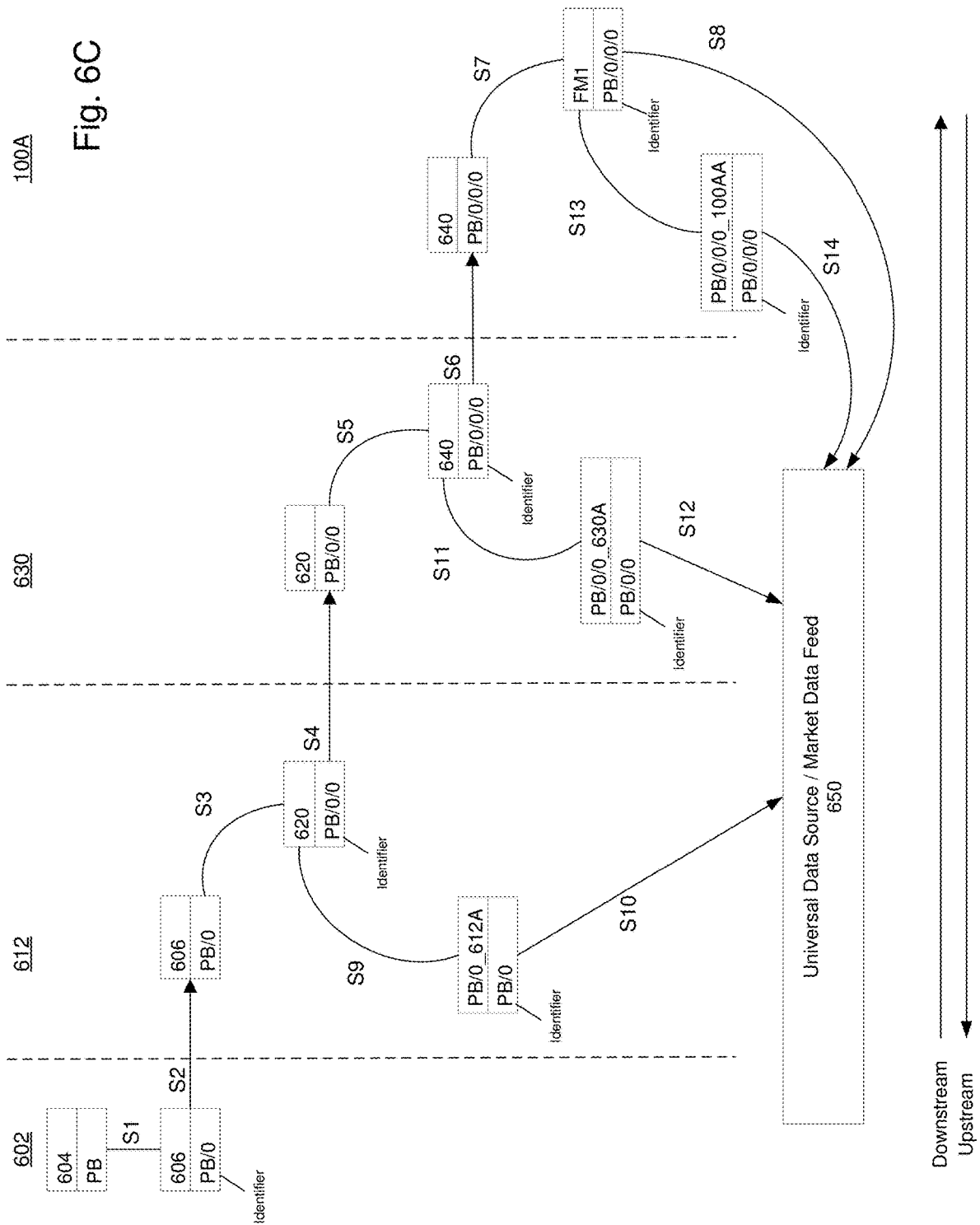
FIG. 6C depicts yet another system implementing a token management system, according to some embodiments.

FIG. 6C illustrates another data flow diagram illustrating an example data flow between some of the entities described in connection with FIG. 6A. FIG. 6C is similar to FIG. 6B, except that the encrypted confidential information is not propagated with other information that may be propagated to another entity. Instead, in FIG. 6C, the encrypted confidential information generated by an entity is stored/written directly in the universal data source 650. Reference numerals and/or element numbers that appear in both FIGS. 6B and 6C should be understood to be referring to the same elements.

For example, as shown in FIG. 6C, at step S3, entity 612 divides order 606 into a plurality of orders including order 620. At step S4, order 620 and token/label PB/0/0 are transmitted downstream to entity 630. Entity 612 generates confidential information 612A, which is then encrypted with public key PB/0, resulting in encrypted confidential information PB/0_612A (step S9). At step S10, entity 612 writes/stores an electronic data transaction result message including encrypted confidential information PB/0_612A to the universal data source 650. Encrypted confidential information PB/0_612A is labeled with an identifier that can be located by entity 602, e.g., identifier PB/0. The encrypted confidential information is accordingly not tied to the transmission of order 620 downstream to entity 630.

In one embodiment, the confidential information generated by a party may be generated after an exchange computing system matches/executes orders. For example, entity 612 may not generate confidential information 612A until after orders stemming from order 606 have been processed by one or more exchange computing systems. When the token management system is implemented as described in connection with FIG. 6C, the timing of (i) the division of order 606 into suborders 620, 622, 624, 626, and 628 and (ii) the generation and encryption of 612A can be different. In other words, because each entity stores the encrypted confidential information in the universal data source, the encrypted confidential information does not need to be sent to other entities that received business level information (e.g., suborders).

As shown in FIG. 6C, at step S5, entity 630 divides order 620 into a plurality of orders including order 640. At step S6, order 640 and token/label PB/0/0/0 are transmitted downstream to entity 100A, which is an exchange computing system. Entity 630 generates confidential information 630A, which is then encrypted with PB/0/0, resulting in encrypted confidential information PB/0/0_630A (step S11). At step S12, entity 630 writes/stores an electronic data transaction result message including encrypted confidential information PB/0/0_630A to the universal data source 650. Encrypted confidential information PB/0/0_630A is labeled with an identifier that can be located by entity 612, e.g., identifier PB/0/0.

As also shown in FIG. 6C, at step S7, entity 100A processes order 640 and generates electronic data transaction result message FM1. Entity 100A then publishes FM1, which is labeled with token/label PB/0/0/0, to the data source/data feed 650, as shown at step S8. Entity 100A generates confidential information 100AA, which is then encrypted with PB/0/0/0, resulting in encrypted confidential information PB/0/0/0_100AA (step S13). At step S14, entity 100A writes/stores an electronic data transaction result message including encrypted confidential information PB/0/0/ 0_100AA to the universal data source 650. Encrypted confidential information PB/0/0/0_100AA is labeled with an identifier that can be located by entity 630, e.g., identifier PB/0/0/0.

Figure 6D:
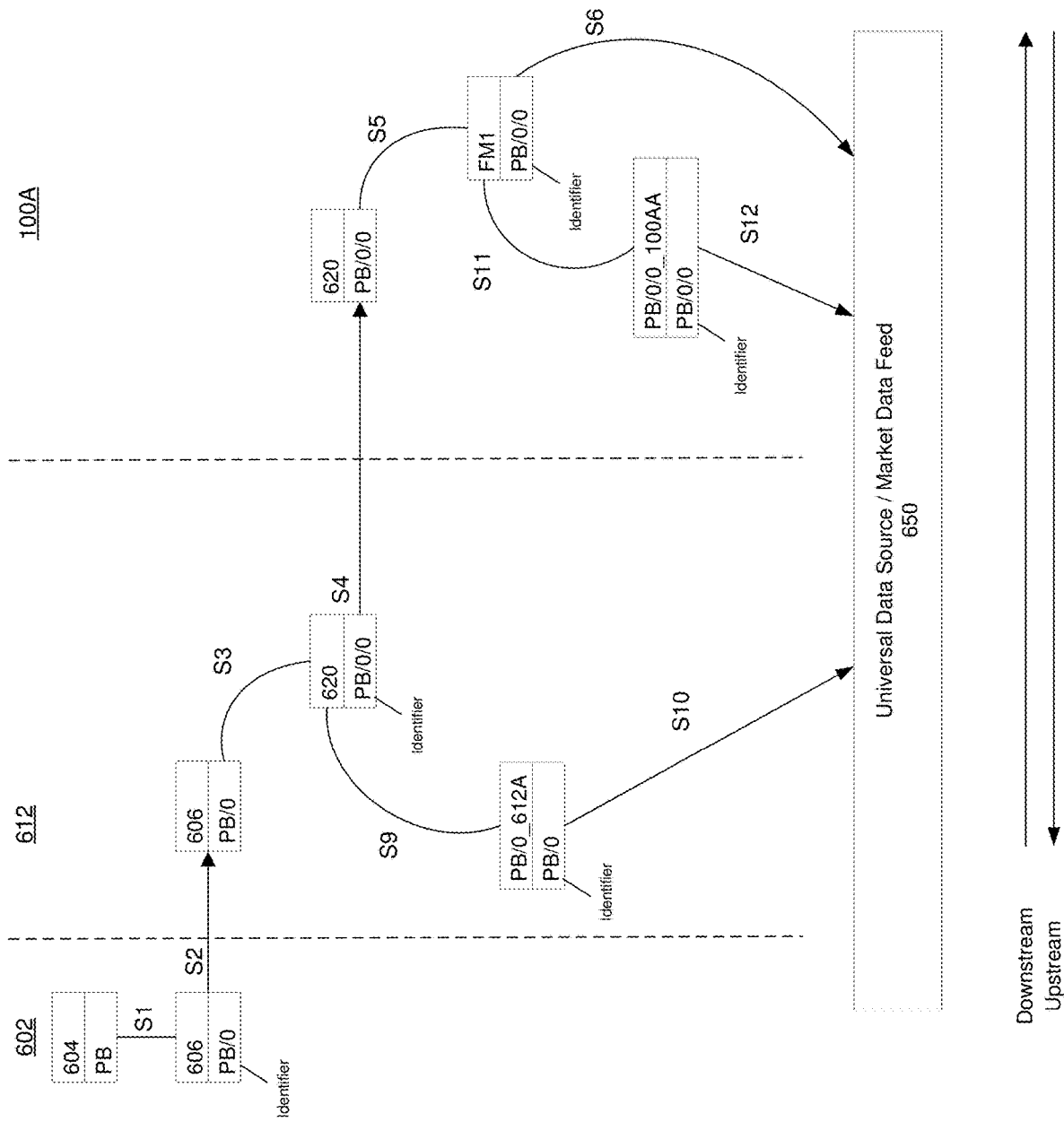
FIG. 6D depicts still another system implementing a token management system, according to some embodiments.

FIG. 6D illustrates another data flow diagram illustrating an example data flow between some of the entities described in connection with FIG. 6A. FIG. 6D is similar to FIG. 6C, except that entity 612 sends an order to the exchange computing system 100A for processing (e.g., matching or attempting to match). In other words, entity 630 described in connection with FIG. 6C is not part of the example data flow of FIG. 6D. In FIG. 6D, steps S7, S8, S13 and S14 (which appear in FIG. 6C) are removed, but the steps have not been renumbered for ease of comparison to FIG. 6C, so the steps illustrated in FIG. 6D are not continuous. Reference numerals and/or element numbers that appear in both FIGS. 6C and 6D should be understood to be referring to the same elements.

For example, as shown in FIG. 6D, at step S3, entity 612 divides order 606 into a plurality of orders including order 620. At step S4, order 620 and token/label PB/0/0 are transmitted downstream to exchange computing system 100A. Entity 612 generates confidential information 612A, which is then encrypted with PB/0, resulting in encrypted confidential information PB/0_612A (step S9). At step S10, entity 612 writes/stores an electronic data transaction result message including encrypted confidential information PB/0_612A to the universal data source 650. Encrypted confidential information PB/0_612A is labeled with an identifier that can be located by entity 602, e.g., identifier PB/0. The encrypted confidential information is accordingly not tied to the transmission of order 620 downstream to exchange computing system 100A.

Entity 100A processes order 620 and generates electronic data transaction result message FM1, as shown at step S5. Entity 100A then publishes FM1, which is labeled with token/label PB/0/0 (the token provided by the upstream entity 612), to the data source/data feed 650, as shown at step S6. Entity 100A may also generate confidential information 100AA associated with order FM1. The token management system instance installed on a computer associated with entity 100A accordingly encrypts confidential information 100AA using the token PB/0/0 provided by entity 612, such encryption being denoted in FIG. 6D as PB/0/0_100AA (step S11). At step S12, entity 100A writes/stores an electronic data transaction result message including encrypted confidential information PB/0/0_100AA to the universal data source 650. Encrypted confidential information PB/0/0_100AA is labeled with an identifier that can be located by entity 612, e.g., identifier PB/0/0. Accordingly, entity 612 can securely read the confidential information generated by entities downstream (e.g., 612, 100A) without needing the entities downstream to directly send the confidential information to entity 612, and without needing entity 612 to send the specific private key used to encrypt the confidential information, resulting in a system that is not well-known, well-understood, conventional or routine.

The disclosed embodiments accordingly facilitate securely communicating confidential information associated with orders without needing the confidential information sender to send the confidential information directly/privately to the confidential information recipient, and without needing the recipient and sender to agree beforehand on the actual private/public key pair to be used, in a system where anonymity of parties needs to be maintained across multi-party transactions, and where information indicative of a relationship between multiple orders also needs to be maintained as (additional) confidential information.

In one embodiment, the token management system locates messages based on the extended labels. The token management system then parses each message and decrypts the encrypted portion using the label.

FIG. 7 depicts an illustrative embodiment of a token management system 700. Token management system 700 may be implemented in an order generation/transmission system as used by a first market participant to submit orders to an exchange computing system or to other market participants, such as market participants downstream of the first market participant.

Token management system 700 includes a token generator 702, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to generate private and public tokens for one or more orders. The token generator 702 may generate tokens based on HD cryptography, as discussed herein, e.g., in a manner compliant with the Bitcoin BIP32 standard for hierarchical deterministic wallets. In one embodiment, token management system 700 includes a hardware security module (HSM) for secure storage of private keys/tokens.

Token management system 700 includes a message augmentor 704, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to augment one or more request messages with public tokens. The request messages may be generated by another system, e.g., an order management system, into which the token management system 700 is integrated.

Token management system 700 includes a transmitter 706, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to transmit, via the network 160, augmented request messages to other market participants.

Token management system 700 includes a parser 708, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to parse through market data feeds, which may contain electronic data transaction result messages/financial messages including/labeled with a plurality of tokens. The parser 708 may additionally determine if tokens generated by the token generator 702 appear in the contents of financial messages, and if so, determine that a plurality of financial messages corresponding to a detected token are associated with each other.

In one embodiment, the parser 708 may also be configured to parse through each financial message to determine the different portions of encrypted confidential information that have been encrypted by different entities. For example, referring to FIG. 6B, a financial message may include encrypted confidential information generated/encrypted by entities 612, 630 and 100A. The parser identifies that the financial message includes these different encrypted confidential information portions.

Token management system 700 includes an encryptor 710, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to encrypt confidential information using a public token.

Token management system 700 includes a decryptor 712, which may be implemented as a separate component or as one or more logic components, such as on an FPGA which may include a memory or reconfigurable component to store logic and processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to decrypt encrypted confidential information using a private token.

The token generator 702 causes the processor 202 to generate the private token necessary to decrypt encrypted confidential information. The token generator 702 may generate the private token based on a determination of the public token used to encrypt the confidential information.

For example, referring to FIG. 6C, token generator 702 of entity 602's token management system instance may identify a result message based on an identifier PB/0/0/0 (because PB/0/0/0 can be derived from PB/0, transmitted out by entity 602). Encrypted confidential information 100AA, in that identified result message, is encrypted with PB/0/0/0.

Entity 602's token management system information can also determine the private token corresponding to PB/0/0/0 (specifically, PR/0/0/0), by following the same derivation path used to generate PB/0/0/0. In other words, the HD key derivation path/process for generating PB/0/0/0 from PB/0 can be applied by entity 602 to generate PR/0/0/0 from PR/0. Notably, only entity 602 has access to PR/0, and therefore only entity 602 can generate/derive PR/0/0/0.

It should be appreciated that only private keys can be used to decrypt encrypted confidential information. If an entity wishes to allow another party to view/decrypt encrypted confidential information, then that party must be given a private key. For example, referring to FIGS. 6B and 6C, entity 612 may wish to allow entity 630 view confidential information 100AA, which is stored by entity 100A in the universal data source 650 as encrypted confidential information PB/0/0/0_100AA. As described above, only an entity with access to PR/0/0/0 (corresponding to PB/0/0/0) can decrypt encrypted confidential information PB/0/0/0_100AA. If entity 612 passes the private key PR/0/0/0 corresponding to PB/0/0/0 to entity 630, entity 630 can now identify and decrypt encrypted confidential information PB/0/0/0_100AA in the same manner described above in which entity 612 would have identified and decrypted encrypted confidential information PB/0/0/0_100AA. (It should be appreciated that in this example, for entity 612 to pass PR/0/0/0 to entity 630, then entity 602 must first have passed PR/0 to entity 612.) An implementation where allowing a party to view/decrypt encrypted confidential information may be useful is if entity 612 wishes to allow entity 630 to aggregate all fees associated with processing order 620, so that entity 612 does not have to locate/decrypt multiple/ different messages containing encrypted confidential information.

FIG. 8 illustrates an example flowchart of an example computer implemented method 800 of securely communicating confidential information between client computers. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

At step 802, method 800 includes generating, by a processor associated with a first client computer, an electronic data transaction request message. At step 804, method 800 includes generating, by the processor, a first public token based on a first private token. At step 806, method 800 augmenting, by the processor, the electronic data transaction request message with the first public token. At step 808, method 800 transmitting, by the processor, the augmented electronic data transaction request message to a second client computer over a network.

At step 810, method 800 includes generating, by the processor, a second public token based on the first public token. At step 812, method 800 identifying, by the processor, from a database of electronic data transaction result messages, an electronic data transaction result message labeled with the second public token, the identified electronic data transaction result message including encrypted confidential information, wherein the database is accessible to the first and second client computers over the network. At step 814, method 800 includes generating, by the processor, a second private token corresponding to the second public token used to identify the electronic data transaction result message. At step 816, method 800 includes decrypting, by the processor, the encrypted confidential information with the second private token.

In one embodiment, the processor is a first processor, and wherein the encrypted confidential information is generated and encrypted with the second public token by a second processor associated with the second client computer. For example, a second client computer may generate and encrypt confidential information that is relevant to an entity associated with the first client computer. Accordingly, even though the electronic data transaction result message is published in a public database, where all subscribers/users may access information about the results of processing the electronic data transaction request message, the confidential information is only accessible to the entity associated with the first client computer.

In one embodiment, the second public token is independently generated by the first client computer and the second client computer. For example, the second client computer may generate the second public token to encrypt confidential information, and to label the encrypted confidential information. The first client computer may generate the second public token to locate the encrypted confidential information, and to generate the second private token used to decrypt the encrypted confidential information.

For example, the client computers implementing the disclosed token management system may all follow the Bitcoin BIP32 standard for hierarchical deterministic wallets, and may accordingly all be able to generate public tokens deterministically. In one embodiment, the tokens are derived from hierarchical deterministic keys that are based on elliptic curve cryptography.

In one embodiment, the electronic data transaction result message is generated in response to processing the electronic data transaction request message. In one embodiment, processing the electronic data transaction request message comprises determining whether an attempt to match the electronic data transaction request message with at least one previously received but unsatisfied electronic data transaction request message for a transaction which is counter thereto results in at least partial satisfaction of one or both of the electronic data transaction request message and the at least one previously received but unsatisfied electronic data transaction request message.

In one embodiment, the plurality of electronic data transaction result messages including any of the second plurality of public tokens are based on the first plurality of request messages, wherein the electronic data transaction result messages have an association with each other as being based on the first plurality of request messages, and wherein the association is not discernable to any other market participants other than the first market participant. In one embodiment, the request messages in the first plurality of request messages are associated with each other as being based on an order, and the association of the request messages in the first plurality of request messages to each other is not discernable to the first plurality of market participants.

In one embodiment, a computer implemented method includes generating, by the processor, the tokens based on hierarchical deterministic keys that are based on elliptic curve cryptography. In one embodiment, the first plurality of public tokens is generated based on a private key, e.g., the first market participant may be the originator of an order, such as fund manager 602. Alternatively, the first plurality of public tokens is generated based on one or more extended public keys, e.g., the first market participant may be further downstream than the fund manager, such as broker 630. In one embodiment, the second private token is derived from the first private token using hierarchical deterministic keys using elliptic curve cryptography. In one embodiment, the confidential information is generated and encrypted by a market participant other than the first market participant.

In one embodiment, each of the first plurality of public tokens is characterized as having no association discernable by any of the market participants other than the first market participant with the other of the first plurality of public tokens. For example, because the first plurality of public tokens are generated by the first market participant, i.e., upstream of the market participants other than the first market participant, only the first market participant would know that the first plurality of public tokens are related to each other, e.g., were based on a same order. As long as the first plurality of market participants includes more than one market participant, the first plurality of market participants cannot detect any association between the first plurality of public tokens.

In one embodiment, each of the second plurality of public tokens is characterized as having no association discernable by any of the market participants other than the first market participant with the other of the second plurality of public tokens. The first market participant can generate the second plurality of public tokens from the first plurality of public tokens. As long as the first plurality of market participants includes more than one market participant, the first plurality of market participants cannot detect any association between the second plurality of public tokens, and therefore cannot detect which electronic data transaction result messages are based on the first plurality of request messages.

In one embodiment, the second plurality of public tokens is independently generated by the first market participant and the first plurality of market participants. For example, the first market participant (which could be the fund manager) and the first plurality of market participants (which could be the trade desks 612, 614, and 616, but could also be the brokers 630, 632, 634, 636 and 638 if the trade desks 612, 614, and 616 send request messages to the brokers 630, 632, 634, 636 and 638 instead of sending request messages to the one or more exchange computing systems) each generate the second plurality of public tokens. The first plurality of market participants generates the second plurality of public tokens so that the tokens can be included in the electronic data transaction result messages resulting from the processing/matching performed by the exchange computing system. The first market participant generates the second plurality of public tokens so that the first market participant can then query the database of electronic data transaction result messages to identify that electronic data transaction result messages that are relevant to the first request messages. Accordingly, in one embodiment, the second plurality of market participants generates the second plurality of public tokens based on a number of request messages in the second plurality of request messages. This number of request messages in the second plurality of request messages may not be known to the first market participant. Accordingly, the first market participant generates a third plurality of public tokens that includes the second plurality of public tokens, and wherein a number of public tokens in the third plurality of public tokens is greater than a number of public tokens in the second plurality of public tokens. In other words, in one embodiment, the first market participant does not know how many times the first request messages were further divided before the first market participants request actually reached the one or more exchange computing systems for transaction processing.

As described above, the number of extended public keys that can be derived from a first public key is infinite. Accordingly, a fund manager, or more generally, any party that is not a party that sends request messages to the one or more exchange computing systems, who will subsequently search the database of electronic data transaction result messages, needs to know how many public tokens should be generated from the first plurality of public tokens and thereafter searched for in the database. In one embodiment, the fund manager may set a limit on the number of extended public keys any party downstream may generate and use. In one embodiment, the fund manager may inform each party downstream as to how many extended public keys that party can generate (e.g., a maximum request message number), effectively setting a maximum limit on the number of request messages each party downstream can transmit further downstream (whether it is to another market participant or to one or more exchange computing systems). For example, a party upstream may transmit a maximum request message number to each party downstream.

Accordingly, each party may be able to exercise some control over the actions of the parties downstream. Of course, because of all the benefits of parties downstream being able to exercise their judgment and knowledge to execute orders, including deciding whether an order should be divided further into smaller orders before being sent to an exchange computing system, a party upstream would want to delegate some of decision making to parties downstream. However, because the party upstream eventually will have to generate a number of public tokens to search for in the database of electronic data transaction result messages, the disclosed embodiments contemplate allowing the party upstream to set limits on how many smaller orders/request messages are eventually generated. In one embodiment, a party upstream may inform parties downstream as to which range of extended public keys that each downstream party should use to label/identify request messages (which again, will appear in the resultant electronic data transaction result messages). For example, a party upstream may transmit an allowable range of extended public keys allocated to each party downstream. If a party downstream wishes to go beyond the number or allowable range of extended public keys, the downstream party should ask the party upstream for an exception.

In one embodiment, the parties may communicate the number of hierarchical levels that will be used so that the party that will eventually query the database (e.g., entity 602) knows how many hierarchical levels of keys to generate. For example, referring to FIGS. 6A-6D, each party may communicate upstream how many hierarchical levels have been generated/used. For example, entity 630 may know that 100A, which is the exchange computing system, will attempt to match messages, e.g., the exchange computing system will not further subdivide the orders or generate additional hierarchical levels below the exchange computing system. Accordingly, entity 630 may communicate with/inform entity 612 that there will only be one hierarchical level below entity 630, namely, the hierarchical level associated with exchange computing system 100A. Because entity 612 also adds a hierarchical level (for sending orders to entity 620), and now knows that entity 630 will only use one hierarchical level, entity 612 can communicate with/inform entity 602 that two hierarchical levels will be used/generated below the hierarchical level of entity 612. In other words, entity 602 now knows that there will be at maximum two hierarchical levels added to keys generated by entity 602. Thus, entity 602 will then know that when entity 602 is generating tokens to be able to search for/identify financial messages, it should only search for three total hierarchical levels worth of keys. Accordingly, entity 602 generates keys at the PB/0 hierarchical level (which are sent by entity 602 to entity 612), generates keys at the PB/0/0 hierarchical level (which are sent from entity 612 to entity 630), and generates keys at the PB/0/0/0 hierarchical level (which are sent from entity 630 to entity 100A). Importantly, because entity 602 only needs to search for three total hierarchical levels worth of keys, entity 602 does not need to waste computing power/resources generating keys at the PB/0/0/0/0 hierarchical level (because entity 100A did not subdivide orders or generate a lower hierarchical level).

In one embodiment, the database of electronic data transaction result messages may be one or more market data feeds.

In one embodiment, the second plurality of request messages is greater than the first plurality of request messages. For example, the fund manager may send three messages to the trade desks, who in turn may send five request messages to the next level downstream, which may be the one or more exchange computing systems, or may be another set of market participants (e.g., brokers 630, 632, 634, 636 and 638).

In one embodiment, transmission of one or more electronic data transaction result messages from the one or more exchange computing systems to the first market participant is eliminated. In one embodiment, identifying, by the processor, from the database of electronic data transaction result messages, any electronic data transaction result messages labeled with any of the second plurality of public tokens eliminates a direct transmission of electronic data transaction result messages from the one or more exchange computing systems to the first market participant. For example, the one or more exchange computing systems that generate electronic data transaction result messages may no longer need to transmit messages directly to the first market participant, because the first market participant can, by implementing the token management system 700 and/or method 800, search an industry standard/accepted universal source of data for any electronic data transaction result messages including the second plurality of public tokens derived from the first market participant's first plurality of public tokens.

In one embodiment, each of the plurality of electronic data transaction result messages, if transmitted directly to any of the market participants, may be subject to varying transmission delays while being transmitted directly to any of the market participants. For example, as described above, reporting upstream can become bottlenecked, and information sent upstream from the one or more exchange computing systems to the first market participant is routed through a variety of other parties, such as the brokers 630, 632, 634, 636 and 638 and/or the trade desks 612, 614, and 616. By implementing the token management system 700 and/or method 800, the problem of any such transmission delays can be avoided.

In one embodiment, each of the one or more exchange computing systems is configured to determine whether an attempt to match a request message with at least one previously received but unsatisfied request message for a transaction which is counter thereto results in at least partial satisfaction of one or both of the request message and the at least one previously received but unsatisfied request message. In one embodiment, each request message comprises a trade order, trade modification, trade cancellation, or combination thereof, and each electronic data transaction result message comprises a confirmation message, update message, rejection message, or combination thereof. In one embodiment, the electronic data transaction result messages comprise data representative of a change in a market.

Although some of the examples discussed herein describe request messages as they stream downstream from market participants to one or more exchange computing systems, the disclosed embodiments may be applied to different business transactions involving different entities. For example, an exchange computing system may be the originator of multiple requests, e.g., requests to clear trades which have already been executed by the exchange computing system. The exchange computing system may send the request messages to a clearinghouse, who in turn may clear the trades/requests, which generates multiple resultant messages. Accordingly, the disclosed embodiments may be applied so that the exchange computing system generates a private key, generates a first plurality of extended public keys based on the private key, augments the request messages with the first plurality of public keys, and provides the augmented request messages (including the first plurality of extended public keys) to a clearinghouse. The clearinghouse, an entity downstream of the exchange computing system in this scenario, may perform one or more actions to clear the trades, which may result in multiple resultant messages. Such an entity may generate confidential information which is encrypted in written to the database, either as part of the trade report data, or separately from the trade report data. The clearinghouse may also generate a second plurality of public keys based on the first plurality of public keys, augment the resultant messages with the second plurality of public keys, and thereafter transmit the augmented resultant messages to a database, e.g., a universal source of information, which can be queried by the exchange computing system. In particular, the exchange computing system may separately generate the second plurality of public keys based on the first plurality of public keys, and may then search the database for resultant messages including any of the second plurality of public keys. The exchange computing system can then securely and deterministically associate the resultant messages including any of the second plurality of public keys with each other as being based on the same underlying trades/request messages. The exchange computing system can also use the tokens as discussed herein to securely decrypt the encrypted confidential information written to the database by the clearinghouse.

In one aspect, the disclosure relates to a computer implemented method of securely and deterministically decrypting confidential information associated with a plurality of anonymized result messages by a first party, the plurality of result messages generated by a second party and responsive to a plurality of request messages, the plurality of result messages being responsive to the plurality of request messages not known to the first party, the method comprising: generating, by a processor associated with the first party, the plurality of request messages; generating, by the processor, a first plurality of public tokens based on a first private token; augmenting, by the processor, each of the plurality of request messages with one of the first plurality of public tokens, the augmenting resulting in a plurality of augmented request messages; transmitting, by the processor, the plurality of augmented request messages to the second party; generating, by the processor, a second plurality of public tokens based on the first plurality of public tokens; identifying, by the processor, from a database of result messages, any result messages labeled with any of the second plurality of public tokens, each of the identified result messages including encrypted confidential information; for each identified result message labeled with one of the second plurality of public tokens, generating, by the processor, a second private token corresponding to the one of the second plurality of public tokens; and decrypting, by the processor, the encrypted confidential information from the identified result message using the second private token. In one embodiment, the first party is a first market participant, and wherein the second party is an exchange computing system. In one embodiment, the first party is an exchange computing system, and wherein the second party is a clearinghouse computing system.

In one embodiment, the disclosure relates to a computer implemented method of securely and deterministically decrypting confidential information associated with a plurality of anonymized result messages by a first party, the plurality of result messages generated by a second party and responsive to a request message, the plurality of result messages being responsive to the request message not known to the first party, the method comprising: generating, by a processor associated with the first party, the request message; generating, by the processor, a public token based on a first private token; augmenting, by the processor, the request message with the public token, the augmenting resulting in an augmented request message; transmitting, by the processor, the augmented request message to the second party; generating, by the processor, a plurality of public tokens based on the public token; identifying, by the processor, from a database of result messages, any result messages labeled with any of the plurality of public tokens, each of the identified result messages including encrypted confidential information; for each identified result message labeled with one of the plurality of public tokens, generating, by the processor, a second private token corresponding to the one of the plurality of public tokens; and decrypting, by the processor, the encrypted confidential information from the identified result message using the second private token. In one embodiment, the first party is a first market participant, and wherein the second party is an exchange computing system. In one embodiment, the first party is an exchange computing system, and wherein the second party is a clearinghouse computing system.

In one embodiment, the disclosure relates to a computer implemented method of securely communicating confidential data between a plurality of client computers, the method comprising: generating, by a first processor associated with a first client computer, a first electronic data transaction request message; generating, by the first processor, a first public token based on a first private token; augmenting, by the first processor, the first electronic data transaction request message with the first public token; transmitting, by the first processor, the augmented first electronic data transaction request message to a second client computer; generating, by a second processor associated with the second client computer, a second electronic data transaction request message based on the first electronic data transaction request message; generating, by the second processor, a second public token based on the first public token; augmenting, by the second processor, the second electronic data transaction request message with the second public token; transmitting, by the second processor, the augmented second electronic data transaction request message to a data transaction processing system; processing, by a third processor associated with the data transaction processing system, the second electronic data transaction request message; generating, by the third processor, an electronic data transaction result message in response to processing the second electronic data transaction request message; augmenting, by the third processor, the electronic data transaction result message with the second public token; transmitting, by the third processor, the augmented electronic data transaction result message to a database; generating, by the third processor, confidential information associated with the electronic data transaction result message; encrypting, by the third processor, the confidential information with the second public token; augmenting, by the third processor, the encrypted confidential information with the second public token; transmitting, by the third processor, the augmented encrypted confidential information to the database; generating, by the first processor, the second public token based on the first public token; identifying, by the first processor, from the database, the augmented encrypted confidential information based on the second public token; generating, by the first processor, a second private token corresponding to the second public token used to identify the augmented encrypted confidential information; and decrypting, by the first processor, the encrypted confidential information with the second private token.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
   generating, by a first processor of a plurality of processors communicatively coupled with an electronic communications network, a first request message;
   generating, by the first processor, a first public token derived from a first private token;
   augmenting, by the first processor, the first request message with the first public token;
   transmitting, from the first processor via the electronic communications network, the augmented first request message to a second processor of the plurality of processors;
   generating, by the second processor, a second request message based on the augmented first request message;
   augmenting, by the second processor, the second request message with a second public token derived from the first public token, wherein the second public token is derived indirectly from the first private token;
   transmitting, by the second processor via the electronic communications network, the augmented second request message to a third processor of the plurality of processors;
   generating, by the third processor, in response to processing the augmented second request message, a first result message associated with the second public token;
   storing, by the third processor, the first result message in a universal data source of result messages, wherein the universal data source is accessible to any of the plurality of processors over the electronic communications network; and
   receiving, by a fourth processor of the plurality of processors, a request, based on a specific private token, for all result messages stored in the universal data source associated with any public token directly or indirectly derived from the specific private token and, based thereon, accessing the universal data source and identifying all result messages stored in the universal data source associated with a public token derived directly or indirectly from the specific private token, including the second public token, the fourth processor, using the specific private token, decrypting any encrypted confidential data included therein.

2. The computer implemented method of claim 1, further comprising:
   generating, by the third processor, confidential data associated with the first result message, and a third public token derived from the second public token, wherein the third public token is derived indirectly from the first private token;
   encrypting, by the third processor, the confidential data associated with the first result message based on the third public token;
   generating, by the third processor, a second result message in association with the confidential data associated with the first result message, the second public token, and the third public token; and
   storing, by the third processor, the second result message in the universal data source.

3. The computer implemented method of claim 1, further comprising:
   generating, by the second processor, confidential data associated with the second request message, and a fourth public token derived from the first public token, wherein the fourth public token is derived indirectly from the first private token;

encrypting, by the second processor, the confidential data associated with the second request message based on the fourth public token;

generating, by the second processor, a third result message in association with the confidential data associated with the second request message, and the fourth public token; and storing, by the second processor, the third result message in the universal data source.

4. The computer implemented method of claim 1, wherein the second public token is associated with a particular private token unique thereto, the method further comprising:

receiving, by a fifth processor of the plurality of processors, a request, based on the particular private token, for all result messages stored in the universal data source associated with any public token directly or indirectly derived from the particular private token and, based thereon, accessing the universal data source and identifying all result messages stored in the universal data source associated with a public token derived directly or indirectly from the particular private token, the fifth processor, using the specific private token, decrypting any encrypted confidential data included therein, the identified result messages not including result messages associated with the first public token.

5. The computer implemented method of claim 1, wherein the first and second public tokens are independently generated by the first and second processors.

6. The computer implemented method of claim 1, wherein the first private token and the first and second public tokens are derived from hierarchical deterministic keys that are based on elliptic curve cryptography.

7. The computer implemented method of claim 1, further comprising generating, by a fifth processor, a second private token based on the first private token and using the second private token to access the universal data source to identify all electronic data transaction result messages associated with any public tokens derived directly or indirectly from the first private token and decrypt any encrypted confidential data included therein.

8. The computer implemented method of claim 1, wherein the processing the augmented second request message comprises determining whether an attempt to match the augmented second request message with at least one previously received but unsatisfied request message for a transaction which is counter thereto results in at least partial satisfaction of one or both of the request messages and the at least one previously received but unsatisfied request message.

9. A system comprising:

a first processor of a plurality of processors; and a memory communicatively coupled to the first processor, the memory comprising software that, when executed by the first processor, performs operations that cause the first processor to:

generate a first request message;

generate a first public token derived from a first private token;

augment the first request message with the first public token;

transmit, via an electronic communications network, the augmented first request message to a second processor of the plurality of processors operative to generate a second request message based on the augmented first request message, augment the second request message with a second public token derived from the first public token, and transmit the augmented second request message to a third processor of the plurality of processors, wherein, the third processor, in response to processing the augmented second request message, generates a first result message in association with the second public token and stores the first result message in a universal data source of result messages, wherein the second public token is indirectly derived from the first private token, and wherein the universal data source is accessible to any of the plurality of processors over the electronic communications network; and receive a request, based on the first private token, for all result messages stored in the universal data source associated with any public token directly or indirectly derived from the first private token and, based thereon, accessing the universal data source and identifying all result messages stored in the universal data source associated with a public token derived directly or indirectly from the first private token, including the second public token, and, using the first private token, decrypt any encrypted confidential data included therein.

10. The system of claim 9, wherein the third processor further:

generates confidential data associated with the first result message;

generates a third public token derived from the second public token, wherein the third public token is derived indirectly from the first private token;

encrypts the confidential data associated with the first result message based on the third public token;

generates a second result message in association with the confidential data associated with the first result message, the second public token, and the third public token; and stores the second result message in the universal data source.

11. The system of claim 9, wherein the second processor further:

generates confidential data associated with the second request message, and a fourth public token derived from the first public token, wherein the fourth public token is derived indirectly from the first private token;

encrypts the confidential data associated with the second request message based on the fourth public token;

generates a third result message in association with the confidential data associated with the second request message, and the fourth public token in the universal data source; and stores the third result message in the universal data source.

12. The system of claim 9, wherein each of the first and second public tokens are associated with a particular private token unique thereto and operative to enable identification in the universal data source of all electronic data transaction result messages associated with any public tokens subsequently derived directly or indirectly from a particular public token and decrypt any encrypted confidential data included therein.

13. The system of claim 9, wherein the first and second public tokens are independently generated by the first and second processors.

14. The system of claim 9, wherein the first private token and the first and second public tokens are derived from hierarchical deterministic keys that are based on elliptic curve cryptography.

15. The system of claim 9, wherein the first private token is enabled to generate a second private token based on the first private token and which is used to access the universal data source to identify all electronic data transaction result messages associated with any public tokens derived directly or indirectly from the first private token and decrypt any encrypted confidential data included therein.

16. The system of claim 9, wherein the processing the augmented second request message comprises a determination of whether an attempt to match the augmented second request message with at least one previously received but unsatisfied request message for a transaction which is counter thereto results in at least partial satisfaction of one or both of the request messages and the at least one previously received but unsatisfied request message.

17. A system comprising:
means for generating a first request message;
means for generating a first public token derived from a first private token;
means for augmenting the first request message with the first public token;
means for transmitting the augmented first request message;
means for generating a second request message based on the augmented first request message;
means for augmenting the second request message with a second public token derived from the first public token, wherein the second public token is derived indirectly from the first private token;
means for transmitting, the augmented second request message; and
means for, in response to processing the augmented second request message, generating a first result message in association with the second public token;
means for storing the first result message in a universal data source of result messages; and
means for receiving a request, based on a specific private token, for all result messages stored in the universal data source associated with any public token directly or indirectly derived from the specific private token and, based thereon, accessing the universal data source and identifying all result messages stored in the universal data source associated with a public token derived directly or indirectly from the specific private token, including the second public token, and, using the specific private token, decrypting any encrypted confidential data included therein.

18. The system of claim 17, further comprising:
means for generating confidential data associated with the first result message;
means for generating a third public token derived from the second public token, wherein the third public token is derived indirectly from the first private token;
means for encrypting the confidential data associated with the first result message based on the third public token;
means for generating a second result message in association with the confidential data associated with the first result message, the second public token, and the third public token; and
means for storing the second result message in the universal data source.

19. The system of claim 17, further comprising:
means for generating confidential data associated with the second request message, and a fourth public token derived from the first public token, wherein the fourth public token is derived indirectly from the first private token;
means for encrypting the confidential data associated with the second request message based on the fourth public token;
means for generating a third result message in association with the confidential data associated with the second request message, and the fourth public token in the universal data source; and
means for storing the third result message in the universal data source.

20. The system of claim 17, wherein each of the first and second public tokens are associated with a particular private token unique thereto and operative to enable identification in the universal data source of all electronic data transaction result messages associated with any public tokens subsequently derived directly or indirectly from a particular public token and decrypt any encrypted confidential data included therein.

* * * * *